US010935987B2

(12) United States Patent
Rose et al.

(10) Patent No.: US 10,935,987 B2
(45) Date of Patent: Mar. 2, 2021

(54) LANDING SITE LOCALIZATION FOR DYNAMIC CONTROL OF AN AIRCRAFT TOWARD A LANDING SITE

(71) Applicant: Reliable Robotics Corporation, Mountain View, CA (US)

(72) Inventors: Robert W. Rose, Los Altos, CA (US); Matthew T. Nehrenz, San Jose, CA (US); John P. Couluris, Mountain View, CA (US); Juerg Frefel, Cupertino, CA (US)

(73) Assignee: Reliable Robotics Corporation, Mountain View, CA (US)

( * ) Notice: Subject to any disclaimer, the term of this patent is extended or adjusted under 35 U.S.C. 154(b) by 0 days.

(21) Appl. No.: 16/057,704

(22) Filed: Aug. 7, 2018

(65) Prior Publication Data

US 2020/0050217 A1 Feb. 13, 2020

(51) Int. Cl.
*G05D 1/10* (2006.01)
*G05D 1/00* (2006.01)
*H04N 7/18* (2006.01)

(52) U.S. Cl.
CPC ........... *G05D 1/101* (2013.01); *G05D 1/0011* (2013.01); *H04N 7/185* (2013.01)

(58) Field of Classification Search
CPC ....... G05D 1/101; G05D 1/0011; H04N 7/185
See application file for complete search history.

(56) References Cited

U.S. PATENT DOCUMENTS

2009/0138138 A1 5/2009 Ferren et al.
2012/0078451 A1* 3/2012 Ohtomo .................... G01S 5/16 701/15
2016/0122038 A1* 5/2016 Fleischman .......... G05D 1/0676 701/2
2016/0327956 A1 11/2016 Zhang et al.
2016/0335901 A1* 11/2016 Singh ................... G08G 5/0021
2017/0069214 A1 3/2017 Dupray et al.
2019/0219699 A1* 7/2019 Ahn ........................ G01S 19/53
2019/0248487 A1* 8/2019 Holtz ................... G06K 9/6267
2019/0337641 A1* 11/2019 Blanton .................... B64F 1/20

OTHER PUBLICATIONS

PCT International Search Report and Written Opinion, PCT Application No. PCT/US19/41258, dated Oct. 8, 2019, 17 pages.

* cited by examiner

*Primary Examiner* — Aniss Chad
*Assistant Examiner* — Chase L Cooley
(74) *Attorney, Agent, or Firm* — Fenwick & West LLP

(57) ABSTRACT

A system having components coupled to an aircraft and components remote from the aircraft processes sensor-derived data, transmits information between aircraft system components and remote system components, and dynamically generates updated analyses of position and orientation of the aircraft relative to a desired landing site, while the aircraft is in flight toward the desired landing site. Based on the position and orientation information, the system generates instructions for flight control of the aircraft toward a flight path to the landing site, and can update flight control instructions as new data is received and processed.

18 Claims, 13 Drawing Sheets

260 receive a position output from a GPS of the aircraft 261 compare the position output to a proximity condition characterizing proximity of the aircraft to the landing site 262 upon satisfaction of the proximity condition, transition a camera subsystem of the aircraft to an image capture mode 263 receive the image from the camera subsystem in the image capture mode 264

FIG. 2C

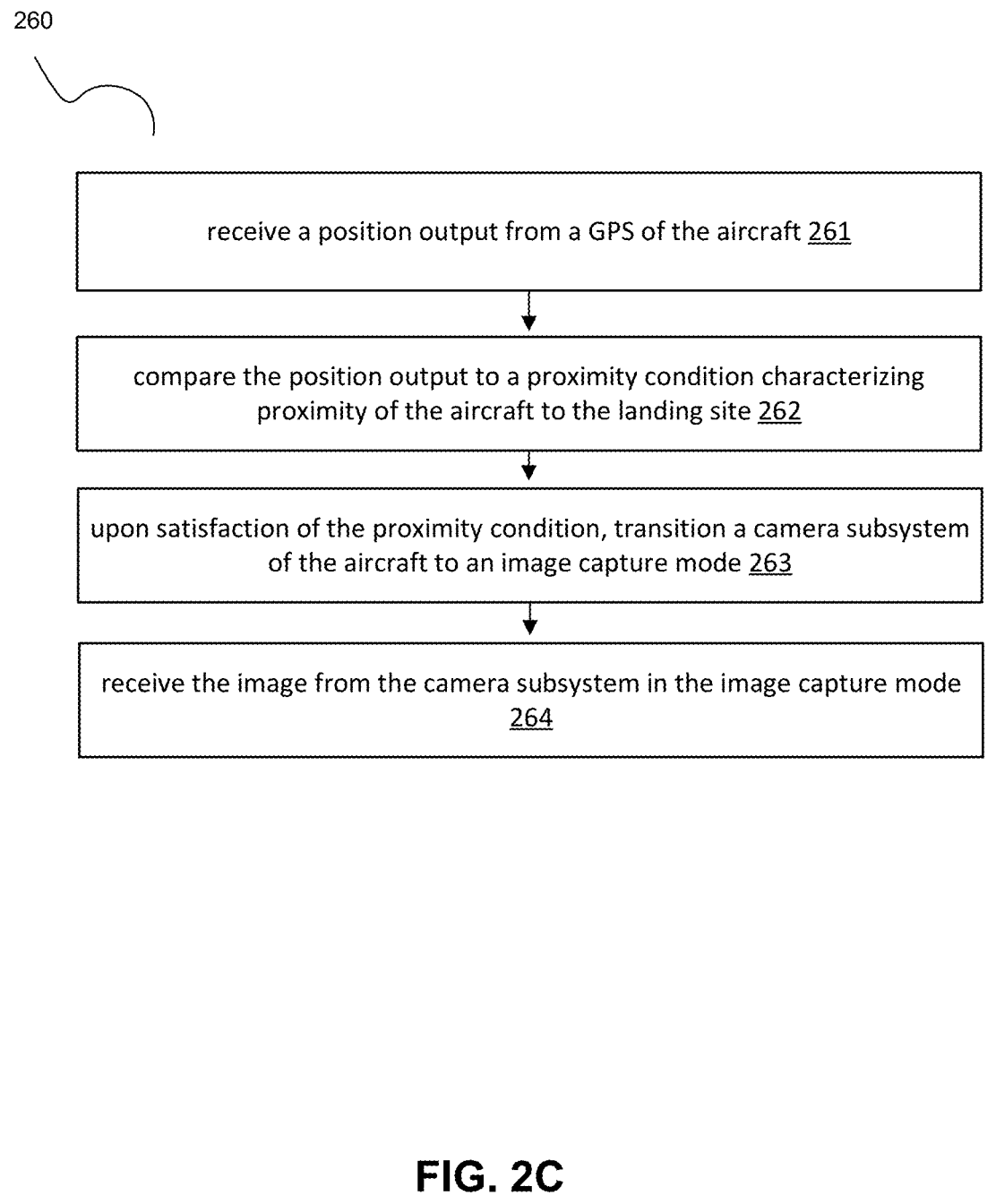

LANDING SITE LOCALIZATION FOR DYNAMIC CONTROL OF AN AIRCRAFT TOWARD A LANDING SITE

BACKGROUND

This disclosure relates generally to landing site localization, and more specifically to determining the location and orientation of an aircraft relative to a landing site (e.g., airport runway) during flight of the aircraft.

The final phases of landing an aircraft are critical, and successful landing requires that the distance to, lateral offset from, elevation offset from, and orientation of an aircraft relative to the landing site to be known to a high degree of certainty. Current systems for navigation (e.g., navigation to an airport, navigation in the vicinity of an airport) require installation and maintenance of expensive apparatus, lack the precision required for automated landing procedures, are not reliable to a high enough degree, and/or are prone to interference. The inventions described herein relate to improved systems and methods for landing site localization, and can be used for executing an automated aircraft landing at a desired landing site.

SUMMARY

While an aircraft is in flight toward the desired landing site, a system having components coupled to the aircraft and components remote from the aircraft processes sensor-derived data, transmits information between aircraft system components and remote system components, and dynamically generates updated analyses of position and orientation of the aircraft relative to a desired landing site. Based on the position and orientation information, the system generates instructions for flight control of the aircraft toward a flight path to the landing site, and can update flight control instructions as new data is received and processed.

BRIEF DESCRIPTION OF THE DRAWINGS

FIG. 2C depicts a flowchart of a portion of a method for landing site localization, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

1. System for Landing Site Localization

Figure 1A:
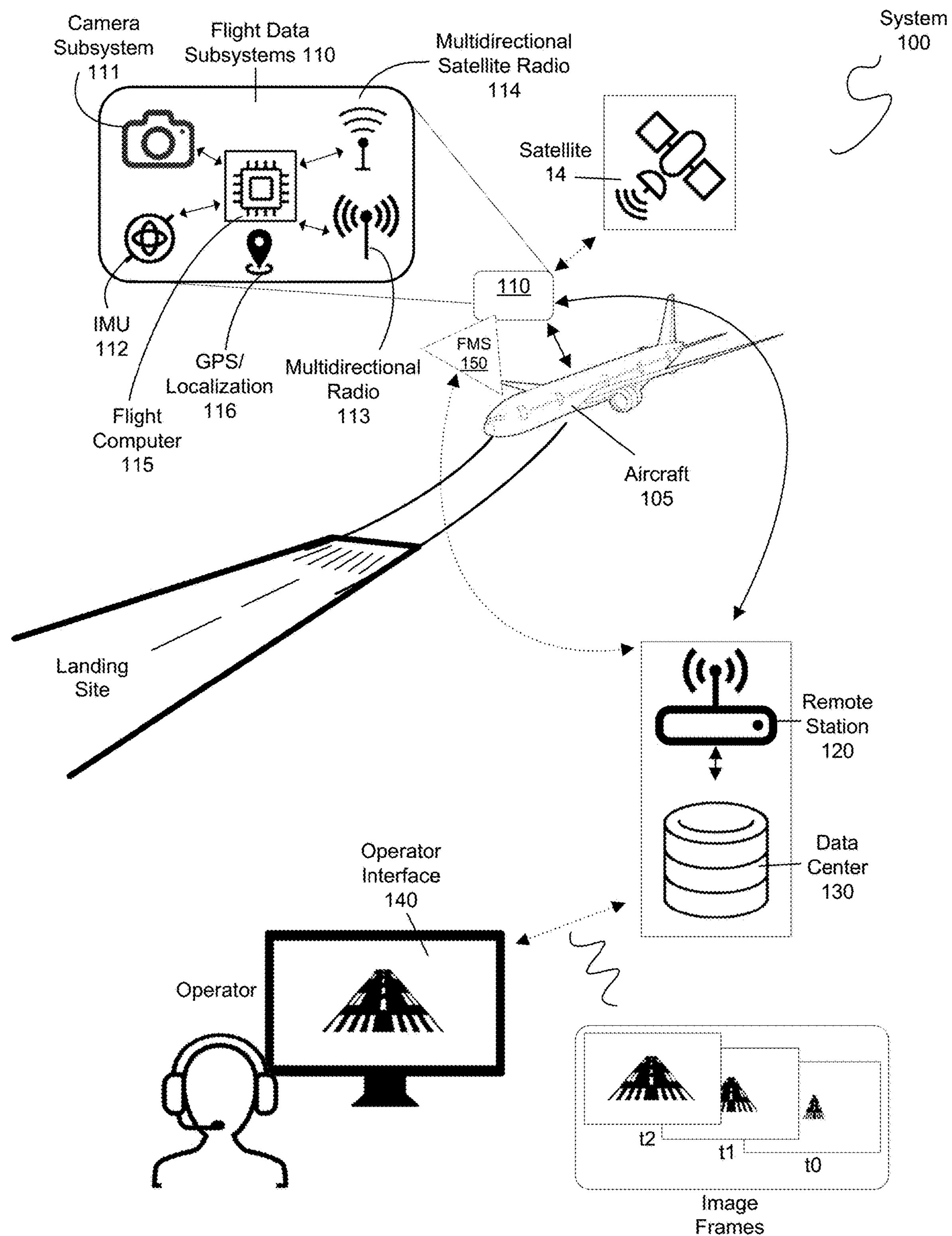
FIG. 1A is a schematic of a system for landing site localization, in accordance with one or more embodiments.

FIG. 1A depicts a schematic of a system 100 for landing site localization, in accordance with one or more embodiments. The system 100 includes one or more flight data subsystems 110 coupled to (e.g., mounted to, onboard, within, etc.) an aircraft 105, a remote station 120 in communication with a data center 130 at a location remote from the aircraft 105, and an operator interface 140 in communication with the remote station 120 by way of the data center 130. The system 100 can also include a flight management system (FMS) 150 including interfaces between the remote station 120 to the FMS 150 and/or interfaces between the flight data subsystems 110 and the FMS 150. The system 100 provides structures, subsystem interfaces, and operation modes useful for implementation of automated flight operations, including operations associated with methods described in more detail in Section 2 below.

1.1 System—Aircraft

The aircraft 105 shown in FIG. 1 is a fixed-wing aircraft. The aircraft has flight control surfaces for aerodynamically affecting flight of the aircraft relative to a pitch axis (i.e., a transverse axis), a yaw axis (i.e., a vertical axis), and a roll axis (i.e., longitudinal axis) of the aircraft. Flight control surfaces can include one or more of: ailerons, flaps, elevators, stabilizers (e.g., horizontal stabilizers), rudders, spoilers, slats, air brakes, vortex generators, trim surfaces, and any other suitable control surfaces. The aircraft also has a power plant for generation of mechanical power associated with flight operations, and in variations, the power plant can include one or more of: a piston engine (e.g., in-line engine, V-type engine, opposed engine, radial engine, etc.), a gas turbine engine (e.g., turbojet engine, turbofan engine), a pulse jet, a rocket, a Wankel engine, a Diesel engine, an electric engine, a hybrid engine, and any other suitable power plant system. The power plant is coupled to an energy source (e.g., fuel system, battery, solar cell, etc.) and a cooling system (e.g., forced convection cooling system, liquid cooling system, oil cooling system, etc.) for aircraft performance in flight.

While this description uses a fixed-wing aircraft as an example, the principles described herein are equally applicable to variations of the aircraft 105 including form factors and/or control surfaces associated with one or more of: rotorcraft, gliders, lighter-than-air aircraft (e.g., airships, balloons), powered-lift aircraft, powered-parachute aircraft, weight-shift-control aircraft, rockets, and/or any other suitable types of aircraft. Still other variations of the system 100 can involve terrestrial vehicles, water vehicles, amphibious vehicles, or other non-aircraft vehicles.

1.2 System—Flight Data Subsystems

The flight data subsystems 110 include subsystems capable of generating data associated with dynamic states of the aircraft, environments about the aircraft, operation states of aircraft systems (e.g., power plant systems, energy systems, electrical systems, etc.), and any other suitable systems associated with operations of the aircraft on the ground or in flight. The flight data subsystems 110 also include subsystems capable of transmitting data to and from the aircraft 105 and other remote systems.

As such, the flight data subsystems 110 include subsystems that generate and receive information generated from subsystems coupled to the aircraft 105, as well as a flight computer 115 providing computational infrastructure (e.g., processing components, communication buses, memory, etc.) for communicating data between the subsystems. The flight computer 115 thus provides architecture for communication of data generated by subsystems, for communication with other systems remote from the aircraft 105, for control of subsystems, and/or for control of the aircraft. The flight data subsystems 110 can thus include specialized computer components designed for use in an aircraft, and in particular, can include components that are customized in configuration relative to each other and customized in relation to processing of signals received and processed to perform aspects of the methods described in Section 2 below.

Information routed between the flight data subsystems 110 and other systems remote from the aircraft 105 can optionally be routed through a flight management system (FMS) 150, configured for automation of flight tasks in relation to a flight plan. The FMS 150 processes navigation database information (e.g., information associated with waypoints, airways, navigation aids, airports, runways, departure procedures, arrival procedures, holding patterns, etc.), aircraft subsystem statuses, and outputs of other subsystems (e.g., radar subsystems, sensor subsystems) and determines one or more desired flight paths based on the information. The FMS can cooperate with the flight computer 115 in receiving outputs of other subsystems of the flight data subsystems 110 and/or transmitting control instructions to affect operational states of other subsystems of the flight data subsystems 110. The FMS 150 can also include or interface with other control systems (e.g., of an autopilot) to transform calculated flight information into instructions for control of control surfaces of the aircraft 105 including one or more of: ailerons, flaps, elevators, stabilizers (e.g., horizontal stabilizers), rudders, spoilers, slats, air brakes, vortex generators, trim surfaces, and any other suitable control surfaces.

1.2.1 System—Flight Data Subsystems—Camera and IMU Components

As shown in FIG. 1A, the flight data subsystems 110 include a camera subsystem 111 mounted to the aircraft, where the camera subsystem 111 includes sensors configured to capture features of the landing site, features of objects in the vicinity of the landing site, features of calibration objects along a path of operation of the aircraft, features of other objects along a path of operation of the aircraft, and/or any other suitable object aspects to facilitate automated landing of the aircraft at a desired landing site.

Sensors of the camera subsystem 111 can utilize the visible spectrum. Sensors of the camera subsystem 111 can additionally or alternatively include longwave infrared (LWIR) sensors (e.g., sensors operating in the 8-12 μm band). The camera subsystem 111 can also include optical elements (e.g., lenses, filters, mirrors, apertures etc.) for manipulating light reaching the sensors of the camera subsystem 111. In relation to detection of airport lighting systems for landing site localization relative to airport lighting, the camera subsystem 111 can include one or more filters optically coupled to the sensors and configured to detect spectra of light emitted from airfield landing systems (e.g., lighting systems in accordance with Federal Aviation Administration Advisory Circular 150/5345-46E). Variations of the camera subsystem 111 can, however, have any other suitable sensor types and/or optical elements associated with visible spectra and/or non-visible spectra electromagnetic radiation.

The camera subsystem 111 can have one or more cameras structurally mounted to the aircraft and positioned so as to enable detection of the landing site or other site relevant to operation of the aircraft, as the aircraft traverses through space. Multiple cameras can be used for system redundancy (e.g., in the event a subset of cameras have occluded optical elements) and/or for providing different field of view options depending on approach path and orientation to a landing site. The camera(s) of the camera subsystem 111 can be coupled to an interior portion of the aircraft 105, or can be coupled to an exterior portion of the aircraft 105. Mounting positions are associated with desired flight paths to a landing site (e.g., approach patterns, instructions from air traffic control, etc.). As such, the camera subsystem 111 can have a camera that has a field of view of at least 270 degrees about the aircraft 105. The camera subsystem 111 can additionally or alternatively have a first camera mounted toward a port side of the aircraft (e.g., for left traffic operations), a second camera mounted toward a starboard side of the aircraft (e.g., for right traffic operations), a third camera mounted toward a nose portion of the aircraft (e.g., for straight-in approaches), and/or any other suitable cameras mounted at any other suitable portion of the aircraft 105.

The camera(s) of the camera subsystem 111 can thus be fixed in position. The camera(s) of the camera subsystem 111 can alternatively be adjustable in position based on flight paths of the aircraft 105 to the landing site. The camera subsystem 111 can thus include actuators coupled to the camera(s) of the camera subsystem 111 and/or position encoders coupled to the actuators, in relation to electronic control of camera positions. In relation to image stabilization, the camera(s) of the camera subsystem 111 can be coupled to image stabilization subsystems (e.g., gimbals) to reduce artifacts due to vibration or other undesired image artifacts that would otherwise be included in image data generated from the camera subsystems 111.

The camera subsystem 111 produces output images that have a characteristic resolution (e.g., associated with a sensor size), focal length, aspect ratio, and/or directionality (e.g., unidirectionality associated with 360 degree images), format color model, depth, and/or other aspects. The camera subsystem 111 can be configured for one or more of: monoscopic images, stereoscopic images, panoramic images, and/or any other suitable type of image output. Furthermore, while images are described, the camera subsystem 111 can be configured to output video data, in relation to the method(s) described in Section 2 below.

Figure 1B:
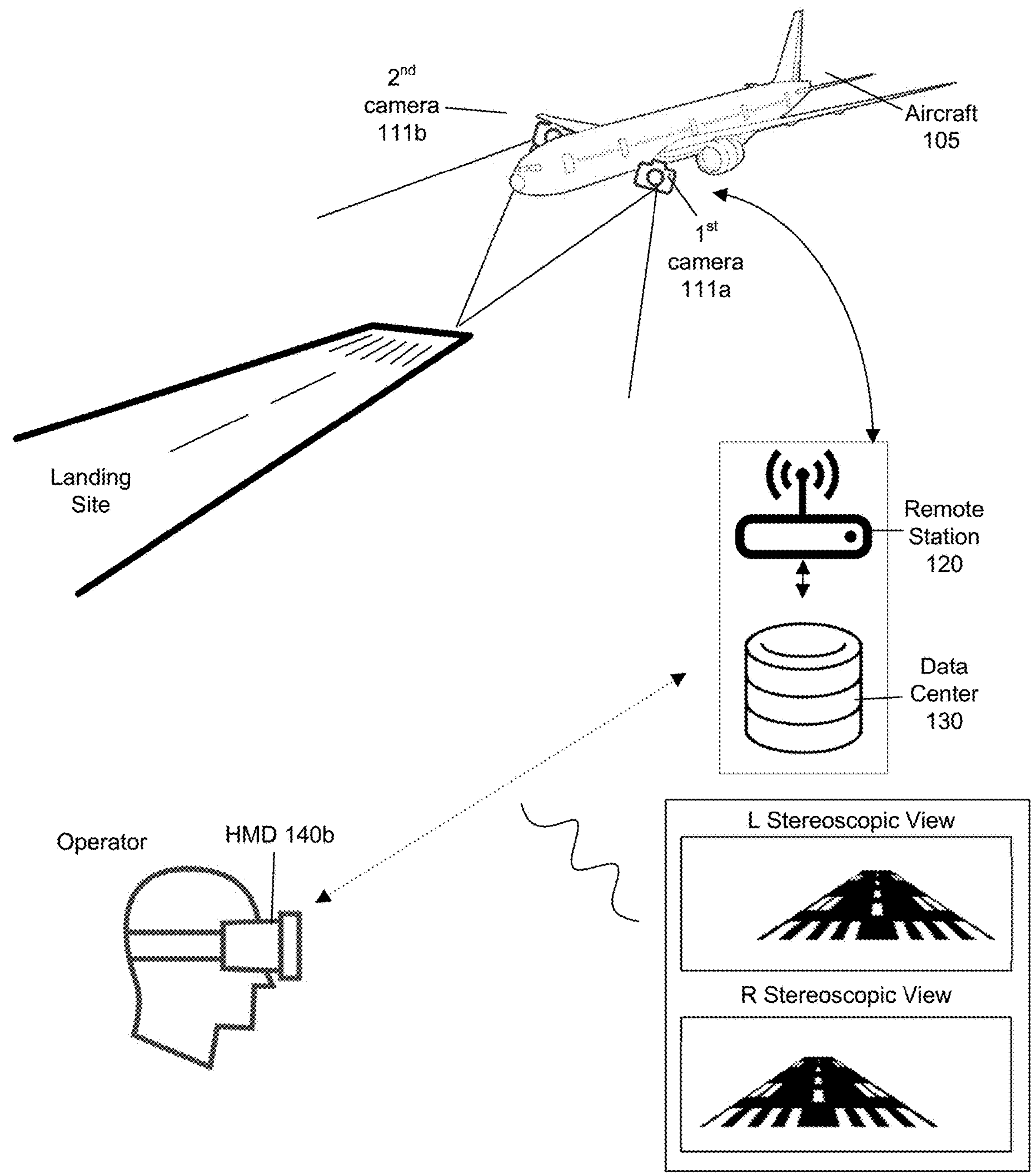
FIG. 1B is a schematic of a variation of a system for landing site localization, in accordance with one or more embodiments.

In one variation, as shown in FIG. 1B, the camera subsystem 111 includes a first camera 111*a* mounted at a port side of the aircraft 105 and a second camera 111*b* mounted at a starboard side of the aircraft, where the first camera 111*a* and the second camera 111*b* collectively have modes for generation of stereoscopic images (e.g., left and right stereoscopic images associated with similar or identical time points of image capture). Stereoscopic images can then be transmitted to an operator wearing a head mounted display (HMD) 140*b* or otherwise interacting with a display of an operator interface for viewing stereoscopic images (e.g., in a 3D image format).

The flight data subsystem 110 also includes one or more inertial measurement units (IMUs) 112 for measuring and outputting data associated with the aircraft's specific force, angular rate, magnetic field surrounding the aircraft 105, and/or other position, velocity, and acceleration-associated data. Outputs of the IMU can be processed with outputs of other aircraft subsystem outputs to determine poses of the aircraft 105 relative to a landing site (or other target), and/or pose trajectories of the aircraft 105 relative to a landing site (or other target). The IMU 112 includes one or more accelerometers, one or more gyroscopes, and can include one or more magnetometers, where any or all of the accelerometer(s), gyroscope(s), and magnetometer(s) can be associated with a pitch axis, a yaw axis, and a roll axis of the aircraft 105.

The IMUS 112 are coupled to the aircraft, and can be positioned internal to the aircraft or mounted to an exterior portion of the aircraft. In relation to measurement facilitation and/or post-processing of data form the IMU, the IMU can be coupled to a vibration dampener for mitigation of data artifacts from sources of vibration (e.g., engine vibration) or other undesired signal components.

Additionally or alternatively, the system 100 can include a radar subsystem that operates to detect radar responsive (e.g., reflective, scattering, absorbing, etc.) objects positioned relative to a flight path of the aircraft 105 (e.g., below the aircraft 105), in order to facilitate determination of pose or state of the aircraft 105 in supplementing methods described below. Additionally or alternatively, the system can include a light emitting subsystem that operates to detect light responsive (e.g., reflective, scattering, absorbing, etc.) objects positioned relative to a flight path of the aircraft 105 (e.g., below the aircraft 105), in order to facilitate determination of pose or state of the aircraft 105 in supplementing methods described below.

1.2.2 System—Flight Data Subsystems—Communication Components

The flight data subsystem 110 also includes a radio transmission subsystem 113 for communication with the aircraft 105, for transmission of aircraft identification information, or for transmission of other signals. The radio transmission subsystem 113 can include one or more multidirectional radios (e.g., bi-directional radios) onboard the aircraft, with antennas mounted to the aircraft in a manner that reduces signal transmission interference (e.g., through other structures of the aircraft). The radios of the radio transmission subsystem 113 operate in approved frequency bands (e.g., bands approved through Federal Communications Commission regulations, bands approved through Federal Aviation Administration advisory circulars, etc.).

The flight data subsystem 110 can also include a satellite transmission subsystem 114 for interfacing with one or more satellites including satellite 14. The satellite transmission subsystem 114 transmits and/or receives satellite data for navigation purposes (e.g., on a scale associated with less precision than that used for landing at a landing site), for traffic avoidance in coordination with automatic dependent surveillance broadcast (ADS-B) functionality, for weather services (e.g., in relation to weather along flight path, in relation to winds aloft, in relation to wind on the ground, etc.), for flight information (e.g., associated with flight restrictions, for notices, etc.), and/or for any other suitable purpose. The satellite transmission subsystem 114 operates in approved frequency bands (e.g., bands approved through Federal Communications Commission regulations, bands approved through Federal Aviation Administration advisory circulars, etc.).

The communication-related components of the flight data subsystems 110 can additionally or alternatively cooperate with or supplement data from other avionics components (e.g., a global positioning system and/or other localization subsystem 116), electrical components (e.g., lights), and/or sensors that support flight operations (e.g., in flight, during landing, on the ground, etc.), that support observability by other traffic, that support observability by other aircraft detection systems, that provide environmental information (e.g., pressure information, moisture information, visibility information, etc.) and/or perform other functions related to aircraft communications and observability.

1.3 System—Remote Components

As shown in FIG. 1A, the system 100 also includes a remote station 120 that includes devices for wirelessly receiving data from and transmitting data to subsystems coupled to the aircraft. The remote station 120 includes one or more multidirectional radios (e.g., bi-directional radios) onboard the aircraft, with antennas mounted to the aircraft in a manner that reduces signal transmission interference (e.g., through other structures of the aircraft). The radios of the remote station operate in approved frequency bands (e.g., bands approved through Federal Communications Commission regulations, bands approved through Federal Aviation Administration advisory circulars, etc.). The remote station 120 is in communication with a data center 130 for storage and retrieval of data derived from subsystems of the aircraft 105 and/or outputs from the operator interface 140 described in more detail below. The data center uses storage and retrieval protocols and can use data encryption protocols for promoting security in relation to handling sensitive information pertaining to autonomous flight of the aircraft 105.

The remote station 120 can also use communications technologies and/or protocols in relation to data transmission operations with the data center 130, subsystems of the aircraft 105, and/or the operator interface 140 described in more detail below. For example, the remote station 120 can have communication links using technologies such as Ethernet, 802.11, worldwide interoperability for microwave access (WiMAX), 3G, 4G, code division multiple access (CDMA), digital subscriber line (DSL), or other communication technologies. Examples of networking protocols used for communications with the remote station 120 include user datagram protocol (UDP) and/or any other suitable protocol. Data exchanged with the remote station 120 can be represented using any suitable format.

Furthermore, in relation to communications-related subsystems, if a communications do not operate as intended (e.g., a communication link fails), the aircraft 105 can be transitioned into a safety operation mode. In an example, in the safety operation mode, the aircraft 105 enters a holding pattern until operation of the communications-related subsystems are restored to proper operation, or until the aircraft 105 can be operated safely/safely landed in another manner.

As shown in FIG. 1A, the system 100 also includes an operator interface 140. The operator interface 140 receives processed data (e.g., image data) generated from the subsystems of the aircraft 105, provides representations of processed data to an operator or other entity (e.g., through a display), and receives inputs provided by the operator or other entity in response to provided representations of processed data. The operator interface 140 can include a conventional computer system, such as a desktop or laptop computer. Additionally or alternatively, the operator interface 140 can include a device having computer functionality, such as a personal digital assistant (PDA), a mobile telephone, a smartphone, a wearable computing device (e.g., a wrist-borne wearable computing device, a head-mounted wearable computing device, etc.), or another suitable device. The operator interface 140 is electronically coupled to the remote station 120 and/or the data center 130 by any combination of local area and/or wide area networks, using transmission and storage protocols, as described above, and can use both wired and/or wireless communication systems.

The operator interface 140 can include a display for presentation of visually-observed digital content (e.g., images/videos from camera subsystem components of the aircraft 105), as shown in FIG. 1A. The operator interface can additionally or alternatively include a head mounted display 140*b* as shown in FIG. 1B for presentation of content to the operator, as described above. In relation to input devices, the operator interface 140 can include one or more of: a touch pad, a touch screen, a mouse, a joystick, an audio input device, an optical input device, and any other suitable input device for receiving inputs from the user.

Portions of one or more of: the flight computer 115 onboard the aircraft 105, the FMS 150, the remote station 120, the data center 130, and the operator interface 140 can operate as a computing system that includes machine-readable instructions in non-transitory media for implementation of an embodiment of the method 200 described below, in relation to one or more of: transmitting an image taken from the camera subsystem 111 and capturing a landing site; receiving a reference position of a reference object associated with the landing site within the image; from the reference position, generating an image-estimated pose of the aircraft 105; updating a pose trajectory of the aircraft 105 upon processing the image-estimated pose and an output from the IMU 112 having a time stamp corresponding to the image; and based upon the pose trajectory, generating a set of instructions for flight control of the aircraft toward a flight path to the landing site (e.g., with the FMS 150, etc.). In relation to flight control, the system 100 can include an electronic interface between the remote station 110 and a flight management system of the aircraft (e.g., as supported by the computing system), the electronic interface operable in a mode that transmits the set of instructions to the flight management system and controls flight of the aircraft toward the flight path. Additional aspects of the method 200 are described in further detail in Section 2 below.

Further, while the system(s) described above can implement embodiments, variations, and/or examples of the method(s) described below, the system(s) can additionally or alternatively implement any other suitable method(s).

2. Method for Landing Site Localization

Figure 2A:
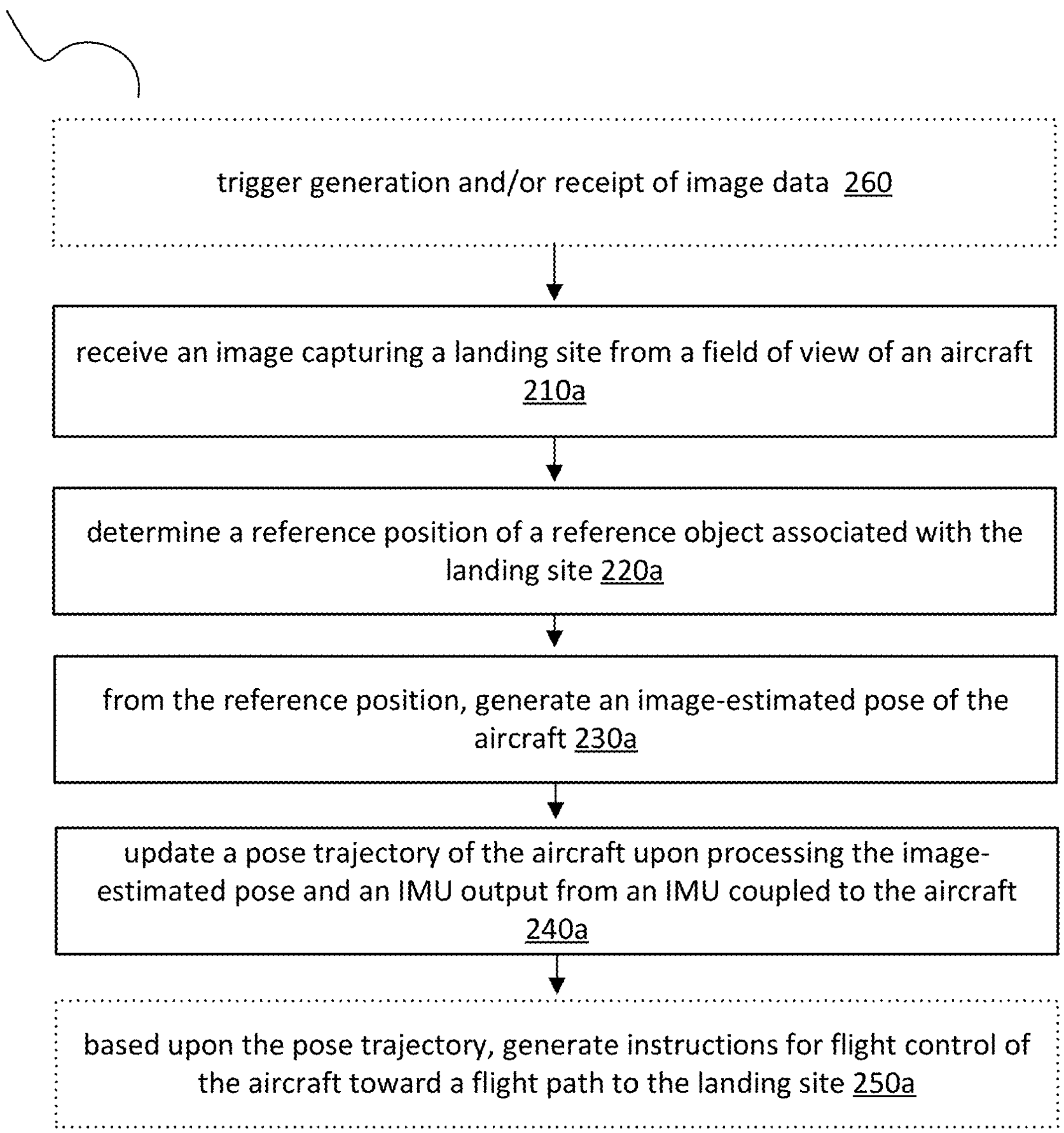
FIG. 2A depicts a flowchart of a method 200 for landing site localization, in accordance with one or more embodiments.
Figure 2B:
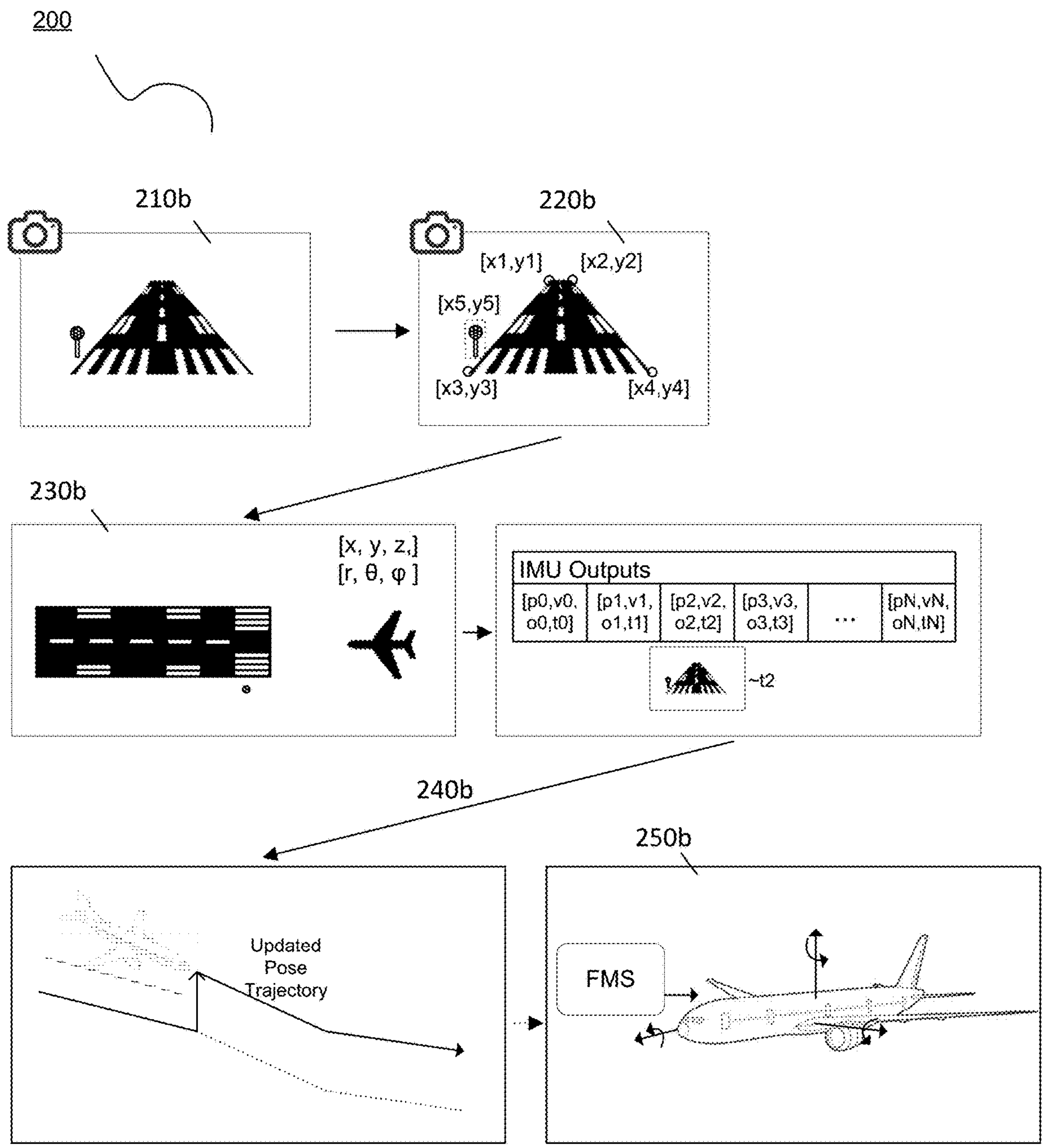
FIG. 2B depicts a schematics of a method flow according to embodiments shown in FIG. 2A.

FIG. 2A depicts a flowchart of a method 200 for landing site localization, in accordance with one or more embodiments. FIG. 2B depicts a schematics of a method flow according to embodiments shown in FIG. 2A. The method 200 functions to process sensor-derived data, transmit information between aircraft subsystems and systems remote from the aircraft, and dynamically generate updated estimates of position and orientation of the aircraft relative to a desired landing site, while the aircraft is in flight toward the desired landing site. Based on the position and orientation information, the method 200 can also generate instructions for flight control of the aircraft toward a flight path to the landing site, and can update flight control instructions as new data is received and processed. The method 200 can also include functionality for directly controlling flight of the aircraft toward the landing site in a reliable and safe manner. The method 200 can be implemented by one or more embodiments of the system 100 described above, in relation to FIGS. 1A and 1B. In particular, portions of the method 200 can be implemented by the computing system components described above, for instance, at a portion of the computing system operating at the remote station and/or at a portion of the computing system operating at a flight computer onboard the aircraft, with communication of inputs and outputs across computing system components as defined by the architecture described above.

2.1 Method—Receiving Data from Aircraft

As shown in FIGS. 2A and 2B, Blocks 210*a* and 210*b* include functionality for receiving an image taken from a camera subsystem coupled to an aircraft, where the image captures a landing site within a field of view of the camera subsystem. In particular, in relation to system elements described above, in 210*a* and 210*b* the remote station wirelessly receives one or more images taken from cameras of the camera subsystem coupled to the aircraft during flight of the aircraft in the vicinity of the landing site. Transmission of the images can occur through data transmission systems of the aircraft and remote station. The remote station and/or other computing system can then process the received image(s) according to subsequent blocks of the method.

In relation to image type, sensors of the camera subsystem involved in image capture can generate visible spectrum images and/or non-visible spectrum (e.g., LWIR) images. In relation to detection of airport lighting systems for landing site localization relative to airport lighting (as described further in relation to Blocks 220 and 220*b* below), the camera subsystem can include and apply filtering (e.g., through filtering optical elements, through operations in software, etc.) to received image data to detect spectra of light emitted from airfield landing systems (e.g., lighting systems and/or markings in accordance with Federal Aviation Administration Advisory Circular 150/5345-46E, lighting systems and/or markings in accordance with International Civil Aviation Organization standards). As described above, in Blocks 210*a* and 210*b*, the computing system can receive images generated from a port side of the aircraft, a starboard side of the aircraft, a belly region of the aircraft, and/or a nose-region of the aircraft for landing site localization.

In relation to Blocks 210*a* and 210*b*, the computing system can receive images that have a characteristic resolution (e.g., associated with a sensor size), aspect ratio, and/or directionality (e.g., unidirectionality associated with 360 degree images), format color model, depth, and/or other aspects. The images can further include one or more of: monoscopic images, stereoscopic images, panoramic images, and/or any other suitable type of image. Furthermore, while images are described, the computing system associated with Blocks 210*a* and 210*b* can receive video data and/or any other suitable type of data.

2.1.1 Method—Optional Submethod for Triggering Receipt of Image Data

FIG. 2C depicts a flowchart of a portion 260 of a method for landing site localization, in accordance with one or more embodiments, where the portion 260 of the method functions to trigger at least one of image capture and image transmission upon detection of a level of proximity between the aircraft and the landing site, as shown in FIG. 2A. The portion 260 of the method can reduce compute power (e.g., in relation to data processing and transmission, in relation to battery management requirements, etc.) that would otherwise be used to process images not capturing the landing site within a field of view. In Block 261, the computing system receives a position output from a global positioning system (GPS) of the aircraft. The position output can be derived from transmissions between a satellite and a GPS onboard the aircraft and describe a geographic distance between the aircraft and the landing site. In an example of Block 261, the computing system (e.g., navigation subsystems of the system) can monitor the geographic location of the aircraft in near real time, calculate the distance between the geographic location of the aircraft and the geographic location of the landing site, and transmit the distance to the computing system of Block 261 as the position output. In variations, the computing system can receive 261 position outputs derived from other distance measuring apparatus, such as a transponder-based distance measuring equipment (DME), a non-directional beacon (NDB), a lateral navigation (LNAV) system, a vertical navigation (VNAV) system, or an area navigation (RNAV) system. Additionally or alternatively, in still other variations, a position output can be determined from dead reckoning using other sensors (e.g., IMU components, etc.), which can be beneficial in GPS-unavailable or GPS-denied scenarios. As such, the computing system can receive position outputs in terms of geographic distances, line-of-sight-distances, or in any other suitable format.

The landing site can be a paved runway (e.g., a runway in Class B airspace, a runway in Class C airspace, a runway in Class D airspace, a runway in other airspace), a landing strip (e.g., paved, grass, dirt), a water landing site, a landing site on snow, a landing site on sand, or any other landing site associated with an approach pattern and/or glide slope. The landing site can alternatively be a landing site associated with vertical takeoff and landing (VTOL) operations, such as those used by a helicopter or distributed electric propulsion (DEP) aircraft. The landing site can also have lighting systems and/or markings described in more detail below in Section 2.2.

As shown in FIG. 2C, in Block 262, the computing system compares the position output to a proximity condition characterizing proximity of the aircraft to the landing site. The proximity condition is a threshold condition describing how close the aircraft is to the landing site (e.g., in terms of geographic distance, in terms of line-of-site distance, etc.). As such, a distance extracted from the position output is compared to a threshold distance. In examples, the proximity condition can be associated with a threshold distance of 15 miles from the landing site, 10 miles from the landing site, 5 miles from the landing site, or any other distance from the landing site. The threshold condition can additionally or alternatively be associated with entrance into airspace associated with the landing site, arrival at a position (e.g., 45 degree entry position, crosswind position, downwind position, base position, final position, etc.) associated with an approach path to the landing site. The threshold condition can additionally or alternatively be dynamically modified based on a speed of operation (e.g., cruise speed, approach speed, landing speed, etc.) of the aircraft, configuration of the aircraft (e.g., in terms of flap operation, spoiler operation, landing gear operation, etc.) and/or a weather condition (e.g., associated with winds, visibility, precipitation, etc.). For instance, the threshold condition can be set to a greater distance threshold if the aircraft is moving at a faster ground speed.

Then, in Block 263, the computing system determines if the proximity condition is met, and transitions a camera subsystem of the aircraft to an image capture mode. In determining satisfaction of the proximity condition, the computing system can determine if the distance of the aircraft to the landing site, extracted from the position output, is less than, equal to, or greater than the threshold distance, and then a remote station or other portion of the computing system can generate camera control instructions that are relayed to the camera subsystem through a camera control unit (e.g., portion of a flight computer) onboard the aircraft, in order to transition the camera subsystem to the image capture mode (or an image transmission mode). Then, the remote station of the computing system can receive the image from the camera subsystem 264. Once the proximity condition is met, the camera subsystem can be held in the image capture and/or transmission modes to transmit images at a desired frequency to the remote station.

Additionally, an onboard computing system can instruct camera subsystem 264 (or an image sensor system thereof) to capture an image using one or more different image capture modes, in order to maximize visibility of items of interest in the image. For example, the system can take images corresponding to a range of exposure times, apertures, focal lengths, and/or any other suitable image-capture parameter. In relation to filtering, if the camera subsystem 264 has selectable Bayer filters or other color filter arrays, color filtering can be applied during image capture as well. The selection criteria associated with different image capture modes can be chosen based upon one or more factors including: contrast information present in an image, time of day, sun ephemeris, moon ephemeris, weather conditions, airspeed, wind conditions, vibration conditions, and/or any other suitable geospatial/atmospheric information observable or known by the onboard computing system.

2.2 Method—Determining Reference Features of Landing Site

As shown in FIGS. 2A and 2B, Blocks 220*a* and 220*b* include functionality for determining a reference position of a reference object associated with the landing site. In Blocks 220*a* and 220*b*, the computing system facilitates processing of the image(s) received from the camera subsystem of the aircraft at a location remote from the aircraft (e.g., at a remote station of the computing system), with manual input by a human entity and/or automatically through image processing and computer vision operations. In Blocks 220*a* and 220*b*, the remote station of the computing system can determine a single position or multiple reference positions of a single reference object or multiple reference objects. As such, the relationships between the reference position(s) and the reference object(s) do not have to be one-to-one.

The reference object(s) associated with Blocks 220*a* and 220*b* can include stationary objects. Stationary objects can include approach lighting systems (e.g., visual approach slope indicator lights, precision approach path indicator lights, other approach lights), runway lighting systems (e.g., lights associated with runway features, lights associated with clearances, lights associated with other air traffic control instructions), taxiway lighting systems (e.g., lights associated with taxiway features, lights associated with clearances, lights associated with other air traffic control instructions, etc.), beacons, other airport lights, and/or other non-airport lights in the vicinity of the landing site. Airport lighting objects can be regulated objects (e.g., according to International Civil Aviation Organization regulations).

The reference object(s) associated with Blocks 220*a* and 220*b* can additionally or alternatively include airport markers associated with runway markings (e.g., centerlines, hold short bars, runway numbers, displaced thresholds, etc.), taxiway markings (e.g., centerlines, approach to hold short bars, instrument landing system position indicators, movement areas, non-movement areas, parking areas, etc.), airport signage, other airport markers, and/or other markers in the vicinity of the landing site. Airport markers can be regulated objects (e.g., according to International Civil Aviation Organization regulations).

The reference object(s) associated with Blocks 220*a* and 220*b* can additionally or alternatively include large scale landing site objects (e.g., runways, taxiways, buildings, fields, transportation infrastructure, other infrastructure, geographic features, etc.), where edges, corners, or any other suitable feature of the objects can be detected and used as a landing site reference.

In determining the position(s) associated with the reference object(s), the remote station of the computing system can receive a packet from the entity, where the packet includes coordinates or other descriptors of the reference positions in space. As such, outputs of Block 220*a* and 220*b* can characterize the position(s) of the reference object(s) associated with the landing site in a format that is computer machine-readable and able to be processed to produce additional outputs in downstream portions of the method.

Variations of manual, autonomous, and semi-autonomous aspects of determining reference features of the landing site are described in Sections 2.2.1-2.2.3 below.

2.2.1 Method—Determining Reference Features of Landing Site—Operator Input

Figure 3A:
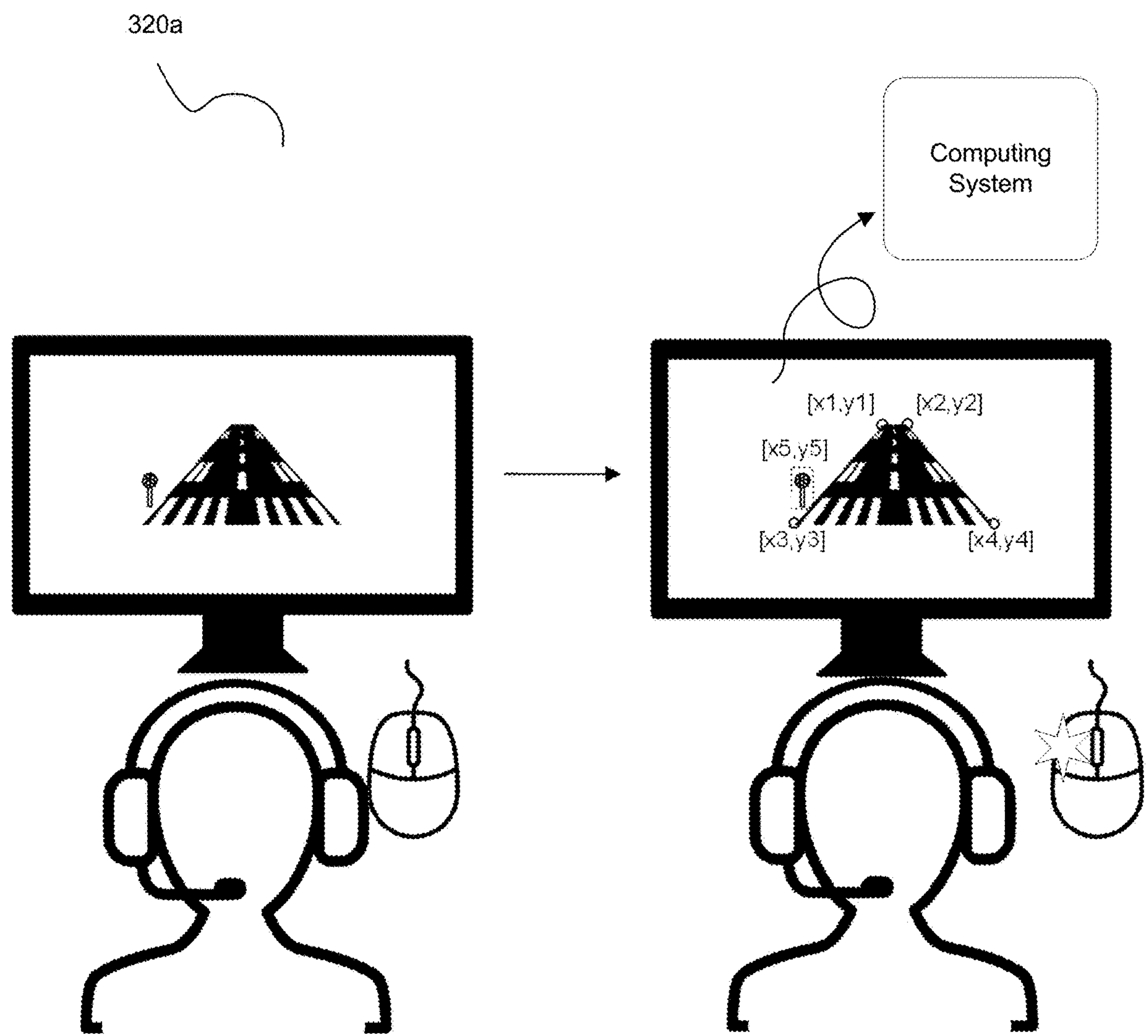
FIG. 3A depicts a schematic of a variation of a portion of the method shown in FIGS. 2A-2B.

FIG. 3A depicts a schematic of a variation of 220*a* and 220*b*, where the images(s) is/are transmitted to an entity at an operator interface, and upon selection of one or more positions of the reference objects(s) associated with the landing site captured in the images, the computing system receives packets characterizing the reference position(s) of the reference object(s). In more detail, for each image generated by the camera subsystem, the computing system (e.g., remote station in communication with a data center) transmits the image to a display of the operator interface for observation by the entity at the operator interface. Through input devices coupled to the display of the operator interface, the entity can then select positions and/or boundary locations of the reference object(s), such as lighting at the landing site, or boundaries of a runway (e.g., positions of corners of a trapezoid defining corners of the runway, positions of points along a runway centerline, etc.) at the landing site. As such, the computing system receives 320*a* packets containing coordinates of the locations of the reference object(s) upon selection of the coordinates by the entity through the operator interface.

2.2.2 Method—Determining Reference Features of Landing Site—Autonomous

Figure 3B:
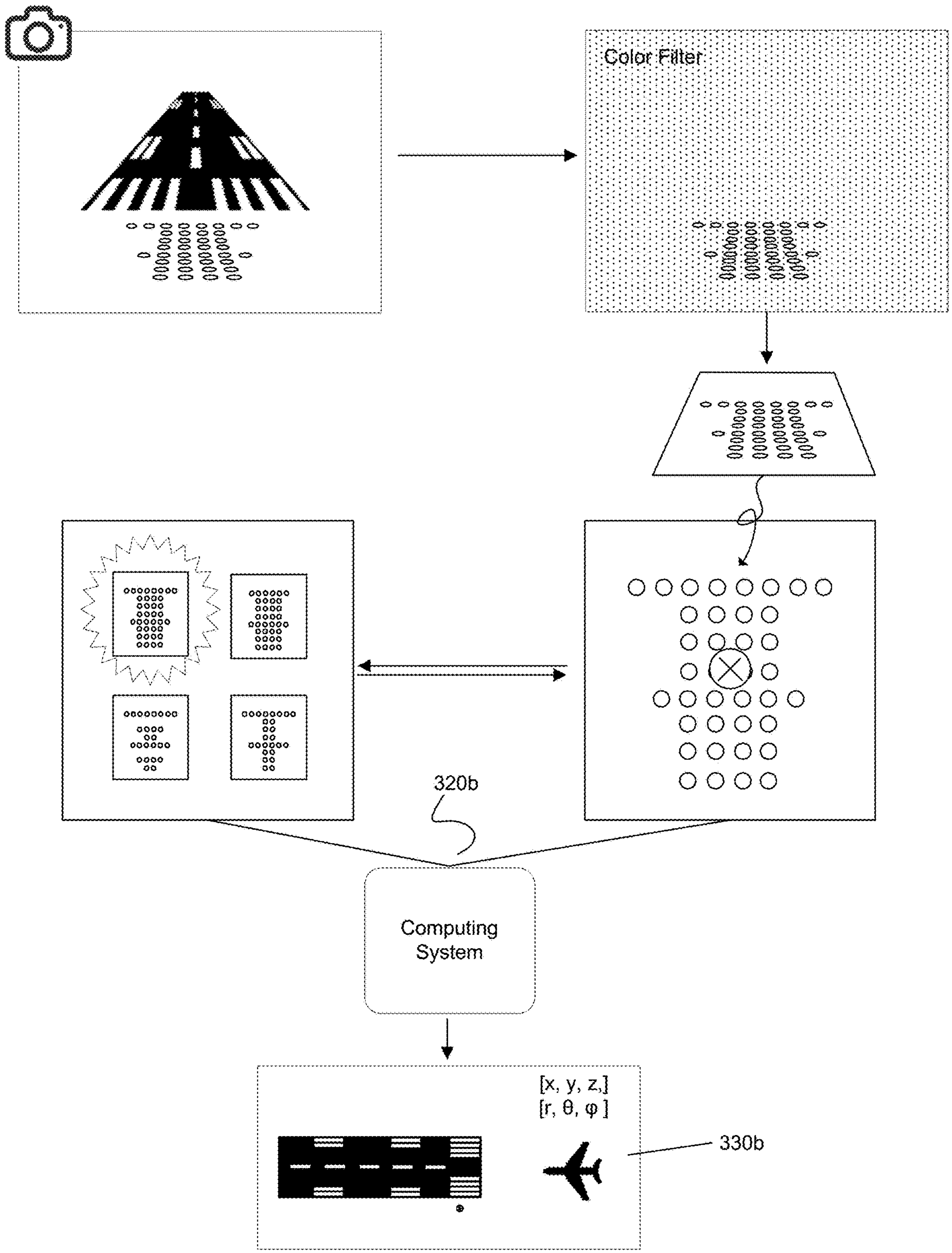
FIG. 3B depicts a schematic of another variation of a portion of the method shown in FIGS. 2A-2B.

FIG. 3B depicts a schematic of another variation of 220*a* and 220*b*, where the images(s) is/are processed onboard automatically by the flight computer or transmitted to a remote computing entity that automatically applies image processing operations to the image(s) and outputs packets characterizing one or more positions of the reference objects(s) associated with the landing site captured in the images. Data packets can be stored in memory until used in downstream portions of the method. In relation to manual and semi-autonomous variations of reference feature determination, data packets can be transmitted remotely to the remote station for observation by a manual operator (as in the fully manual method) discussed previously. Regardless of where this method is carried out, for each image generated by the camera subsystem, the computing system (e.g., remote station in communication with a data center, flight computer) applies a filtering operation to the image to extract or otherwise increase the intensity of features of the reference object(s) captured in the image. The filtering operation can be a color filtering operation that isolates image pixels associated with a particular color (e.g., light wavelength, paint color, signage color, etc.) of the reference object to generate a color-filtered image. The filtering operation can also apply contrasting operations and/or saturation increasing operations to increase the contrast prior to or post application of a color filter. The filtering operation can also stack or aggregate multiple images in another manner in order to increase contrast.

After application of the filtering operation, the computing system then applies a centroid algorithm to identify a center position of the reference objects, which in the image shown in FIG. 3B include an array of light objects at the landing site. Alternative embodiments can omit application of a centroid algorithm and alternatively use another feature extraction approach (e.g., speeded up robust feature approach, oriented FAST and rotated BRIEF approach, scale invariant feature transform approach, etc.) locating a reference position of an object within an image. The computing system can also apply a transformation operation to transform the image (or filtered version thereof) from a 3D space to a 2D space, using a homography matrix operation, covariance matrix operation, or another transformation operation. The computing system can then automatically compare and match the centroid and/or extracted features of the transformed image to a database of airport lighting positions, including lighting positions at the landing site (e.g., using a random sample consensus operation, using an iterative closest point operation, etc.). In more detail, transformations of the images can include scaling operations, perspective skewing operations, rotation operations, and/or any other suitable operations that transform inbound images to a form that maps onto a scale, perspective, rotation, or other format aspect of the images in the database of airport lighting positions. Matching can then be performed between transformed images that have analogous formats to the image formats in the database of airport lighting positions. Outputs of the transformation and matching processes are then used to generate data packets associated with coordinates of the locations of the reference objects (e.g., lights). As such, the computing system receives 320*b* packets containing coordinates of the locations of the reference object(s) upon generation of the coordinates in an automated manner using image processing and matching operations.

Figure 3C:
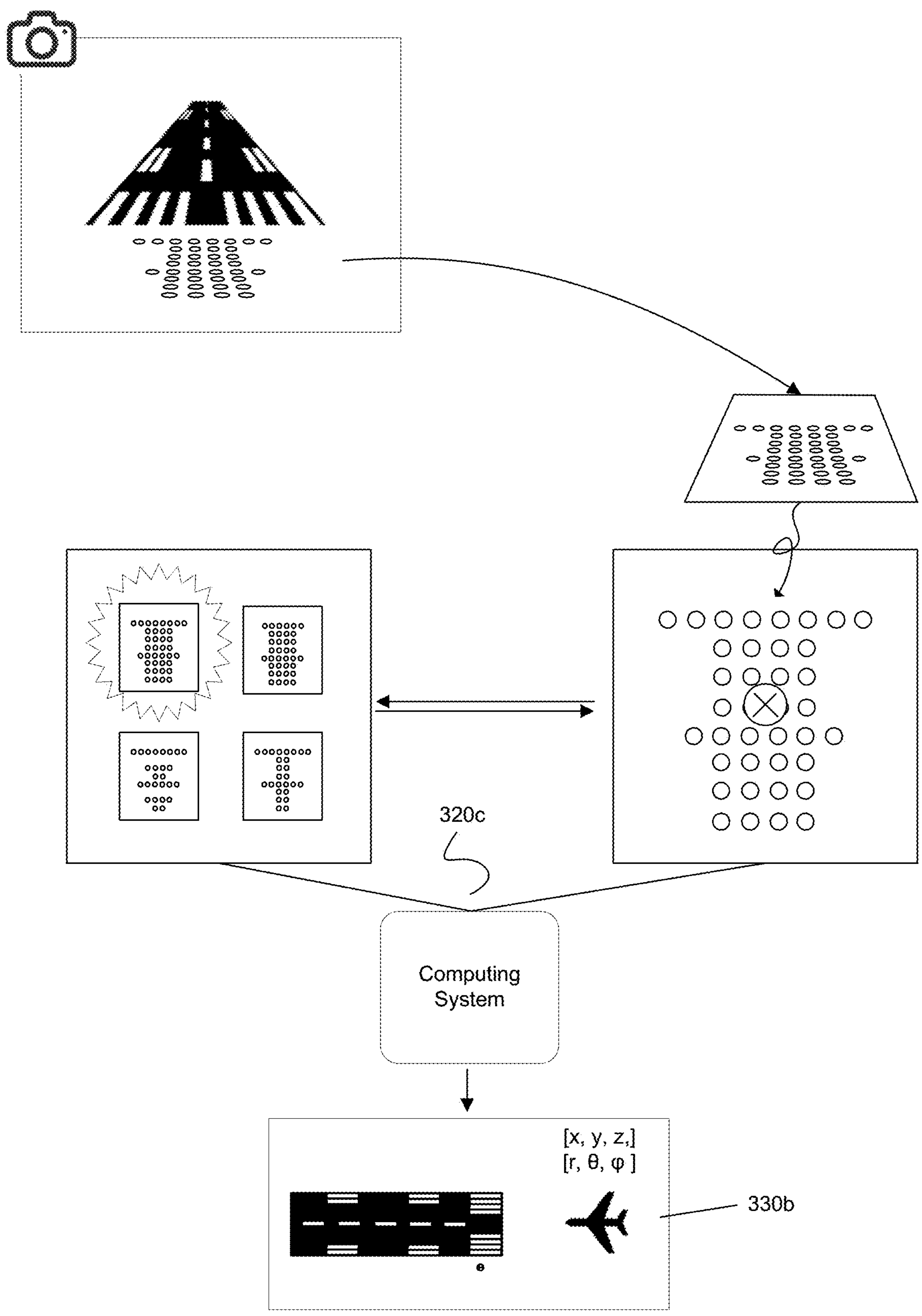
FIG. 3C depicts a schematic of an alternative variation to the variation of the portion of the method shown in FIG. 3B.

FIG. 3C depicts a schematic of an alternative variation to the variation of the portion of the method shown in FIG. 3B, where, in the alternative variation the computing system and/or remote computing entity omits application of a filtering operation to generate 320*c* the packet including the position(s) of the reference object(s). In still alternative variations, the computing system and/or remote computing entity can omit application of a transformation operation from 3D to 2D space in relation to comparing and matching images against a database of airport reference objects.

2.2.3 Method—Determining Reference Features of Landing Site—Semi-Autonomous

Figure 3D:
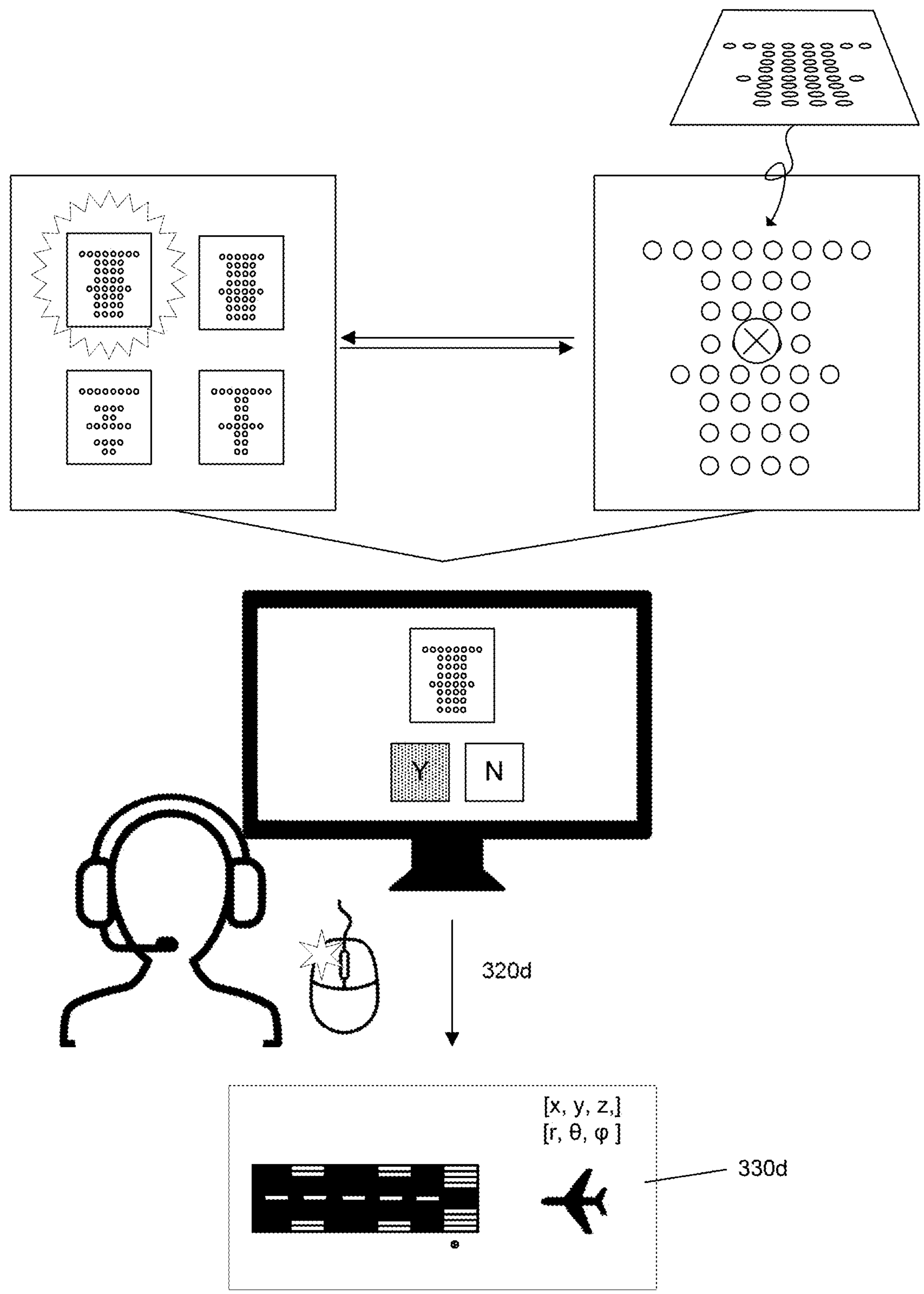
FIG. 3D depicts a schematic of another variation of a portion of the method shown in FIGS. 2A-2B.

FIG. 3D depicts a schematic of another variation of 220*a* and 220*b*, where the images(s) is/are transmitted to a remote computing entity that automatically applies image processing operations to the image(s), where the image processing operations can be similar to or identical to those performed in relation to FIGS. 3B and 3C. After processing the images, the remote computing entity can then transmit digital content derived from image processing to an entity at an operator interface. The entity at the operator interface can then verify the output of the remote computing entity, and upon verification by interaction with an input device of the operator interface, the computing system can receive packets characterizing one or more positions of the reference objects(s) associated with the landing site captured in the images.

2.3 Method—Generating Estimated Pose(s)

As shown in FIGS. 2A and 2B, Blocks 230*a* and 230*b* include functionality for generating an image-estimated pose of the aircraft from outputs of Blocks 220*a* and 220*b*, respectively. In Blocks 230*a* and 230*b*, the computing system (e.g., a portion of the computing system operating at the remote station, a portion of the computing system operating at a flight computer onboard the aircraft) receives the reference position(s) of the reference object(s) associated with the landing site, and applies transformation processes to extract the image-estimated pose of the aircraft at the time that the image was taken. The reference position(s) can be transmitted to the computing system (or between portions of the computing system) with a unique identifier matching the image, such that reference positions can be associated with images and/or time stamps at which the images were taken.

In one variation, in relation to outputs associated with FIG. 3A, the computing system can receive coordinates of bounding corners of the runway within the image, and apply a transformation operation from a dimensional space associated with the image to a dimensional space associated with the camera or sensor from which the image was taken (e.g., using a homography matrix operation, using a covariance matrix operation, etc.). The transformation operation can include an image registration operation (e.g., registration with perspective projection, registration with orthogonal projection, etc.) to extract camera pose from the reference positions of the bounding corners of the runway. Then, the computing system can perform a transformation operation from the dimensional space associated with the camera to the dimensional space associated with the pose of the aircraft to generate the image-estimated pose of the aircraft. Outputs of Blocks 230*a* and 230*b* can include, for each image processed, a position and orientation of the aircraft in 3D space, with global coordinates of the aircraft and rotations about axes of the aircraft.

In another variation, in relation to outputs associated with FIGS. 3B, 3C, and 3D, the computing system receives coordinates of a centroid of an array of airport lights. The computing system can additionally or alternatively receive parameters (e.g., matrix element coefficients) of a transformation process used in the comparing and matching operation of Blocks 320*b*, 320*c*, and 320*d*. Then, based on the centroid and/or parameters of the transformation process, the computing system can apply a transformation operation from a dimensional space associated with the centroid and/or database image to a dimensional space associated with the camera or sensor from which the image was taken (e.g., using a homography matrix operation, using a covariance matrix operation, etc.). The transformation operation can include an image registration operation (e.g., registration with perspective projection, registration with orthogonal projection, etc.) to extract camera pose from the reference positions. Then, the computing system can perform a transformation operation from the dimensional space associated with the camera to the dimensional space associated with the pose of the aircraft to generate 330*b*, 330*c*, 330*d* the image-estimated pose of the aircraft. Outputs of Blocks 330*b*-330*d* can include, for each image processed, a position and orientation of the aircraft in 3D space, with global coordinates of the aircraft and rotations about axes of the aircraft.

2.3.1 Camera Calibration

In generating the image-estimated pose, the computing system can implement a calibration operation on the camera subsystem in order to generate image-estimated poses with a desired level of accuracy, and/or to inform decisions related to flight operations of the aircraft. For instance, an unsuccessful instance of the calibration operation can be used to transition the aircraft to a grounded status, thereby preventing flight of the aircraft until the reason for lack of success of the calibration operation is determined and resolved.

Figure 4A:
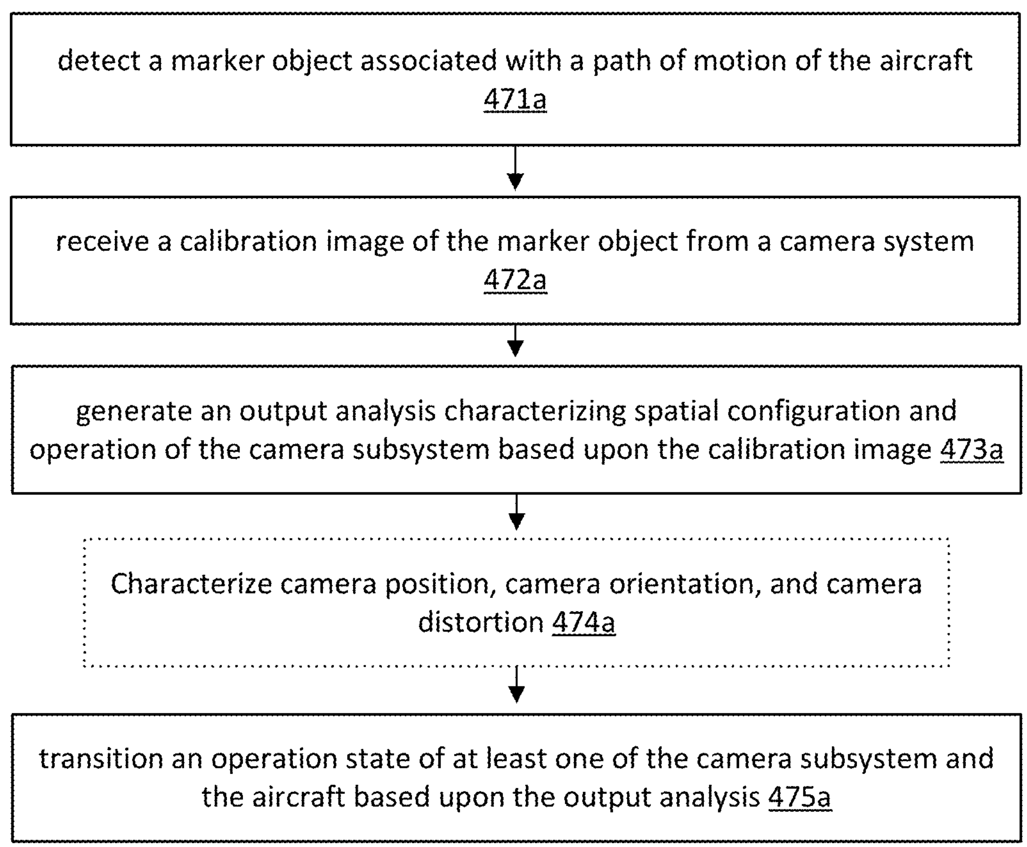
FIG. 4A depicts an embodiment of a method for camera subsystem calibration, in accordance with one or more embodiments.
Figure 4B:
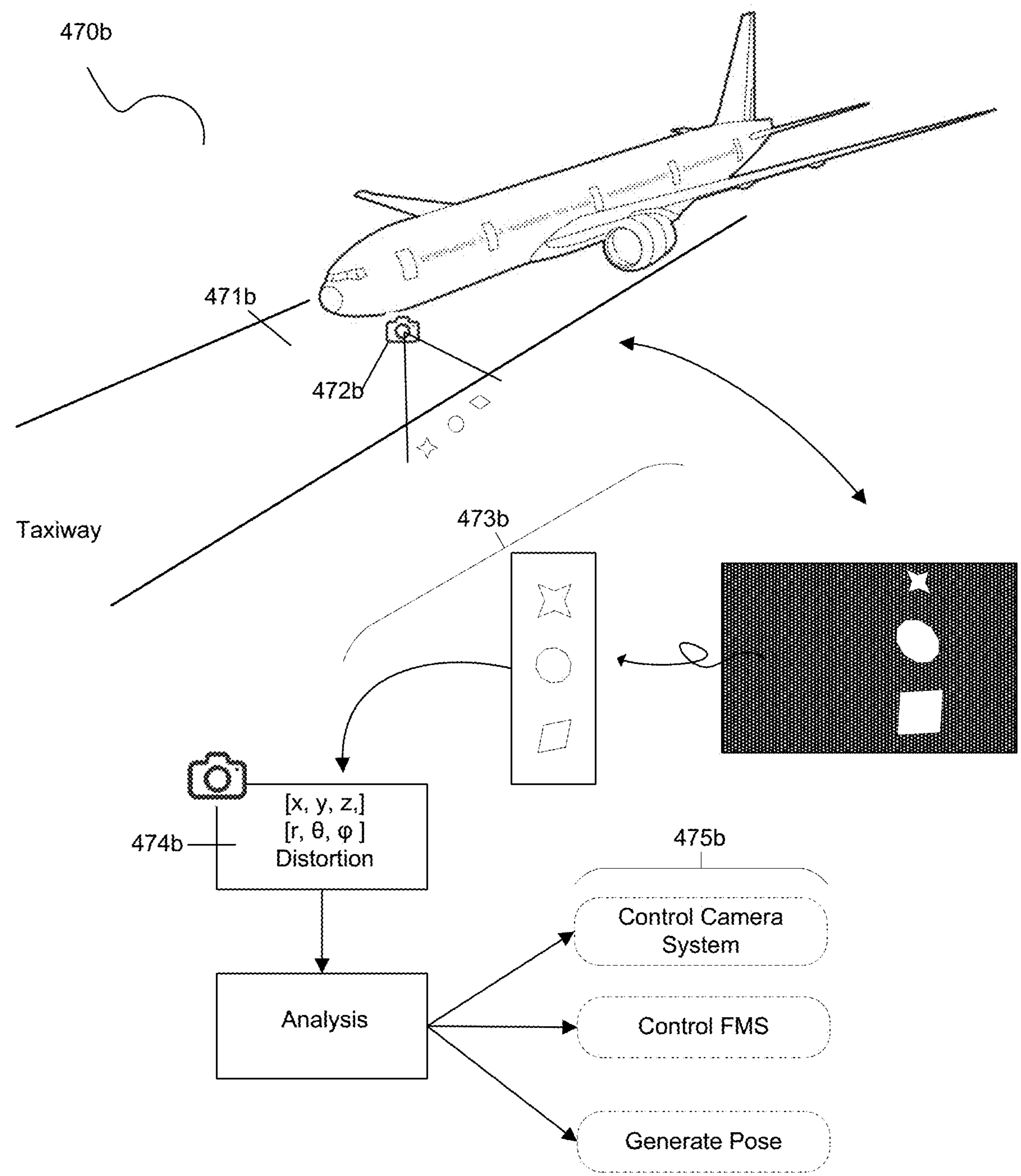
FIG. 4B depicts a schematic of an embodiment of the method shown in FIG. 4A.

FIG. 4A depicts an embodiment of a method 470*a* for camera subsystem calibration, in accordance with one or more embodiments, and FIG. 4B depicts a schematic of an embodiment of the method 470*b* shown in FIG. 4A. The methods shown in FIGS. 4A and 4B are used to precisely determine mounting positions and/or optical properties of camera subsystems used.

In Blocks 471*a* and 471*b*, the computing system (or other detection system onboard the aircraft) detects one or more marker objects near the aircraft using near-field communication methods, optical detection methods, methods based on geographic position of the aircraft, or any other suitable methods.

Then, in Blocks 472*a* and 472*b*, the camera subsystem captures and transmits an image of the one or more marker objects near the aircraft (e.g., a path of motion of the aircraft, a parking position of the aircraft, etc.) and a computing system receives the image. The image is received and processed prior to takeoff of the aircraft (e.g., during a preflight inspection, during a taxiing operation of the aircraft), such that an informed flight decision can be made based on satisfactory calibration of the camera subsystem. However, variations of the methods 470*a* and 470*b* can additionally or alternatively perform instances of the calibration while the aircraft is in flight.

Given known features (e.g., positions, shapes, colors, heights relative to the aircraft, heights relative to the camera subsystem, etc.) of the one or more marker objects, the computing system generates 473*a*, 473*b* an output analysis characterizing spatial configuration and operation of the camera subsystem upon processing a set of features of the marker object(s) extracted from the calibration image against a set of reference features of the marker object(s). Generating the output analysis can include generating 474*a*, 474*b* a camera position output, a camera orientation output, and a camera distortion output. In this regard, the computing system can compare extracted features of the marker object(s) to one or more standard reference images of the marker objects. For instance, standard reference images can be images taken of the marker objects from different heights and/or orientations. As such, generating the camera position output and the camera orientation output can include performing a transformation operation and/or matching operation from an image space associated with the calibration image to a reference space associated with the standard reference image(s), in order to extract the position and orientation of the camera used to take the calibration image. Generating the camera distortion output can include applying algorithms to determine distortion or other artifacts (e.g., noise) in the image, due to hardware (e.g., mounting issues, vibration issues) and/or software issues.

Based on the output analysis, the computing system can then generate 475*a*, 475*b* instructions for control of at least one of the camera subsystem and the aircraft based upon the output analysis. For instance, control of the camera subsystem can include cleaning a sensor of the camera, adjusting a mounting position of the camera (e.g., through actuators and/or gimbals coupled to the camera), rebooting the camera, or re-performing the calibration operation due to an indeterminate result. Control of the aircraft can include approving flight operations and providing instructions (e.g., to an FMS) that allow the aircraft to transition to a flight operation mode, or prohibiting flight operations (e.g., grounding the aircraft) and providing instructions that prevent the aircraft from transitioning to a flight operation mode.

As such, generating the image-estimated pose(s) of the aircraft, as described in Section 2.3 above, can include generating the image-estimated pose(s) from the reference position(s) of the reference object(s) associated with the landing sight, and outputs of the calibration operation, based on known spatial orientation and operation parameters of the camera subsystem determined from the calibration operation.

2.4 Method—Updating Pose Trajectory in Coordination with IMU Outputs

As shown in FIGS. 2A and 2B, once an image-estimated pose is generated for an image received from the camera subsystem, the computing system then updates 240*a*, 240*b* a pose trajectory (e.g., time series of poses) of the aircraft using measurements taken from one or more IMUs onboard the aircraft. Blocks 240*a* and 240*b* thus function to, based on the recent image data from the aircraft taken during flight to the landing site, generate and update a pose trajectory of the aircraft, by combining image data of the landing site with IMU outputs. In more detail, updating of pose estimates based on image-derived information can be used to mitigate drift in propagation of poses generated by dead-reckoning with IMU measurements. As introduced above, the IMU output can include a position value (e.g., associated with a global reference frame), a velocity value, an orientation value, and a time stamp. IMU outputs can additionally include an altitude value, an angular rate value, and any other value of a parameter derived from acceleration or angular rate data. As such, the image-estimated poses can be processed with IMU outputs to determine or update pose values of the aircraft relative to the landing site, as opposed to another reference.

The pose trajectory includes aircraft poses (e.g., coordinates in Cartesian space with rotational coordinates about rotational axes) associated with time stamps of images taken by the camera subsystem. The pose trajectory also includes aircraft poses associated with time stamps of IMU outputs (e.g., in relation to a buffer or data stream of IMU outputs). The pose trajectory can also include aircraft poses interpolated between time points of images and/or IMU outputs. The pose trajectory can also include poses extrapolated or projected to time points beyond time stamps associated with images and/or IMU outputs. As such, Blocks 240*a* and 240*b* can include functionality for adjusting or correct past poses associated with time points prior to a current state of the aircraft, time points associated with a current state of the aircraft, and/or time points projected to times beyond a current state of the aircraft.

As shown in FIG. 2B, the computing system can process an image-estimated pose having a time stamp with an IMU output having the same or a similar (e.g., nearest) time stamp to compute an updated pose of the aircraft relative to the a location of the landing site. Computing the updated pose can include performing a vector, array, or matrix manipulation process (e.g., transformation, addition, etc.) to combine information from an IMU output with information from the image-estimated pose. In more detail, if position or orientation components of the image-estimated pose are more accurate than IMU measurements, the associated image-estimated pose components can be used to replace components of the matching IMU-based pose estimate. The computing system can then apply a forward propagation operation to IMU data (e.g., IMU data having time stamps unassociated with images, IMU data having time stamps associated with images) until another image-estimated pose is processed, thereby updating the pose trajectory with information computed from the image-estimated pose. Alternatively, image-estimated pose components can be averaged with IMU measurements across a window of time associated with the image-estimated pose, and forward propagation with the averaging process can be performed until another image-estimated pose is processed.

2.5 Method—Flight Control

As shown in FIGS. 2A and 2B, the method 200 can include functionality for controlling flight of the aircraft toward a flight path to the landing site. Based on the image-estimated pose, an updated pose taking into account image data and IMU data, and/or the updated pose trajectory, the computing system (e.g., a portion of the computing system operating at the remote station, a portion of the computing system operating at a flight computer onboard the aircraft, etc.) generates 250*a*, 250*b* instructions for flight control of the aircraft to the landing site. The flight computer or other computing components controlling operation of flight control surfaces receive the instructions and control operational configurations of one or more control surfaces of the aircraft to maintain or redirect flight of the aircraft toward the landing site. As such, blocks 250*a* and 250*b* include functionality for controlling flight of the aircraft toward the flight path upon transmitting the set of instructions to a flight computer of the aircraft and manipulating one or more flight control surfaces of the aircraft based on the set of instructions.

In Blocks 250*a* and 250*b*, the computing system (e.g., the flight computer) can use generated instructions to control configuration states of one or more of: ailerons of the aircraft (e.g., to affect flight about a roll axis), flaps of the aircraft (e.g., to affect rate of descent), elevators of the aircraft (e.g., to control flight about a pitch axis), rudders of the aircraft (e.g., to control flight about a yaw axis), spoilers of the aircraft (e.g., to control lift of the aircraft), slats of the aircraft (e.g., to control angle of attack of the aircraft), air brakes (e.g., to control drag of the aircraft), trim surfaces (e.g., to control trim of the aircraft relative to any axis and/or reduce system mechanical load), and any other suitable control surfaces of the aircraft.

In Blocks 250*a* and 250*b*, the computing system (e.g., the flight computer) can also use generated instructions to control configuration states of power plant components including one or more of: manifold pressure, revolutions (e.g., revolutions per minute), fuel mixture, electrical output from a battery, cooling system operational states (e.g., in relation to cowl flaps, in relation to liquid cooling systems, in relation to fins, etc.) for aircraft performance toward the landing site.

In Blocks 250*a* and 250*b*, the computing system (e.g., the flight computer) can also use generated instructions to control other aircraft system aspects. For instance, the generated instructions can be used to control communications with air traffic control at the landing site, in relation to automated reception and/or read back of instructions from air traffic control.

In relation to pose or pose trajectory of the aircraft, the computing system generates instructions that account for aircraft orientation due to environmental effects and landing procedures due to environmental effects. For instance, the computing system can generate instructions upon detecting crosswinds and computing a crosswind control factor for the ailerons and rudders of the aircraft. In another example, computing system can generate instructions for a flight path to a preferred runway due to prevailing winds at the landing site (e.g., to avoid landing with a significant tail wind). In another example, the computing system can generate instructions for power plant settings in relation to winds at the landing site.

In relation to pose or pose trajectory of the aircraft, the computing system can also generate instructions that account for landing site features and/or geographical features about the landing site. For instance, the computing system can generate instructions for producing a steeper or flatter approach (e.g., with slipped configuration settings, with flap settings, with landing gear settings, etc.) based on runway features (e.g., length, position relative to geography, position relative to obstacles along the approach path, etc.). In another example, the computing system can generate instructions for control surface settings and/or power plant settings based on runway features, such as uphill grade, downhill grade, roughness, wetness, type (e.g., grass, dirt, water, snow, etc.), width, and/or any other suitable landing site feature. In another example, the computing system can generate instructions for control of the aircraft and/or verification of appropriate pose relative to a desired runway, which can be beneficial if there are multiple parallel runways and/or taxiways about the desired runway for landing.

In relation to pose or pose trajectory of the aircraft, the computing system can also generate instructions that account for type of landing gear of the aircraft. For instance, the computing system can generate instructions to maintain orientation for a three-point landing for an aircraft with a conventional landing gear configuration (e.g., tailwheel). In another example, the computing system can generate instructions to adjust orientation for a wheel landing for an aircraft with a conventional landing gear configuration. In another example, the computing system can generate instructions to adjust orientation for an aircraft with a tricycle gear setting. In another example, the computing system can generate instructions to adjust orientation for an aircraft with a crosswind landing gear.

However, the computing system can generate instructions used by the flight computer to control aircraft operation for other aircraft aspects, other environmental aspects, and/or other landing site aspects.

2.6 Method—Additional Blocks and Applications

Figure 5:
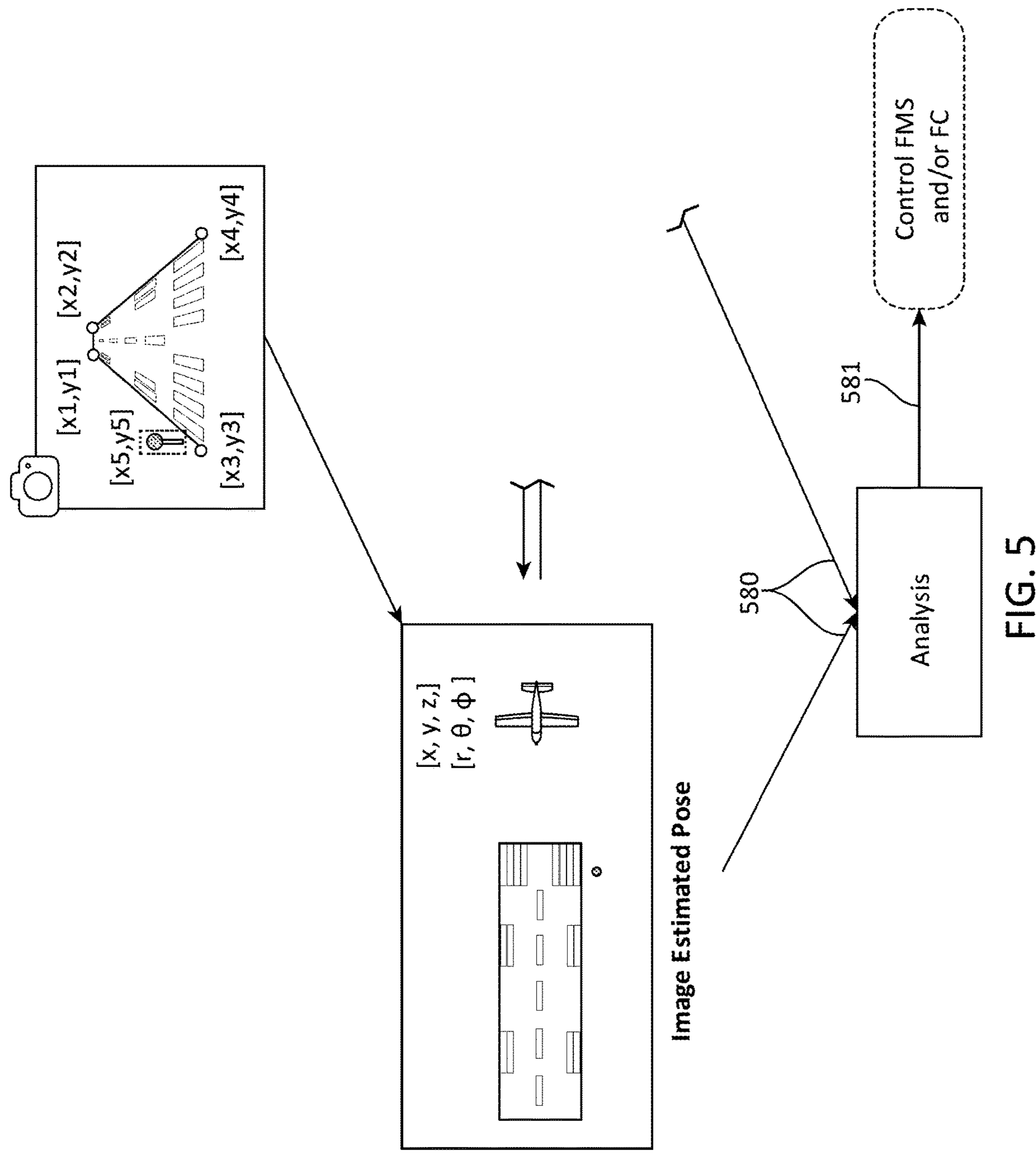
FIG. 5 depicts a method for performing a system check, in accordance with one or more embodiments.
Figure 5:
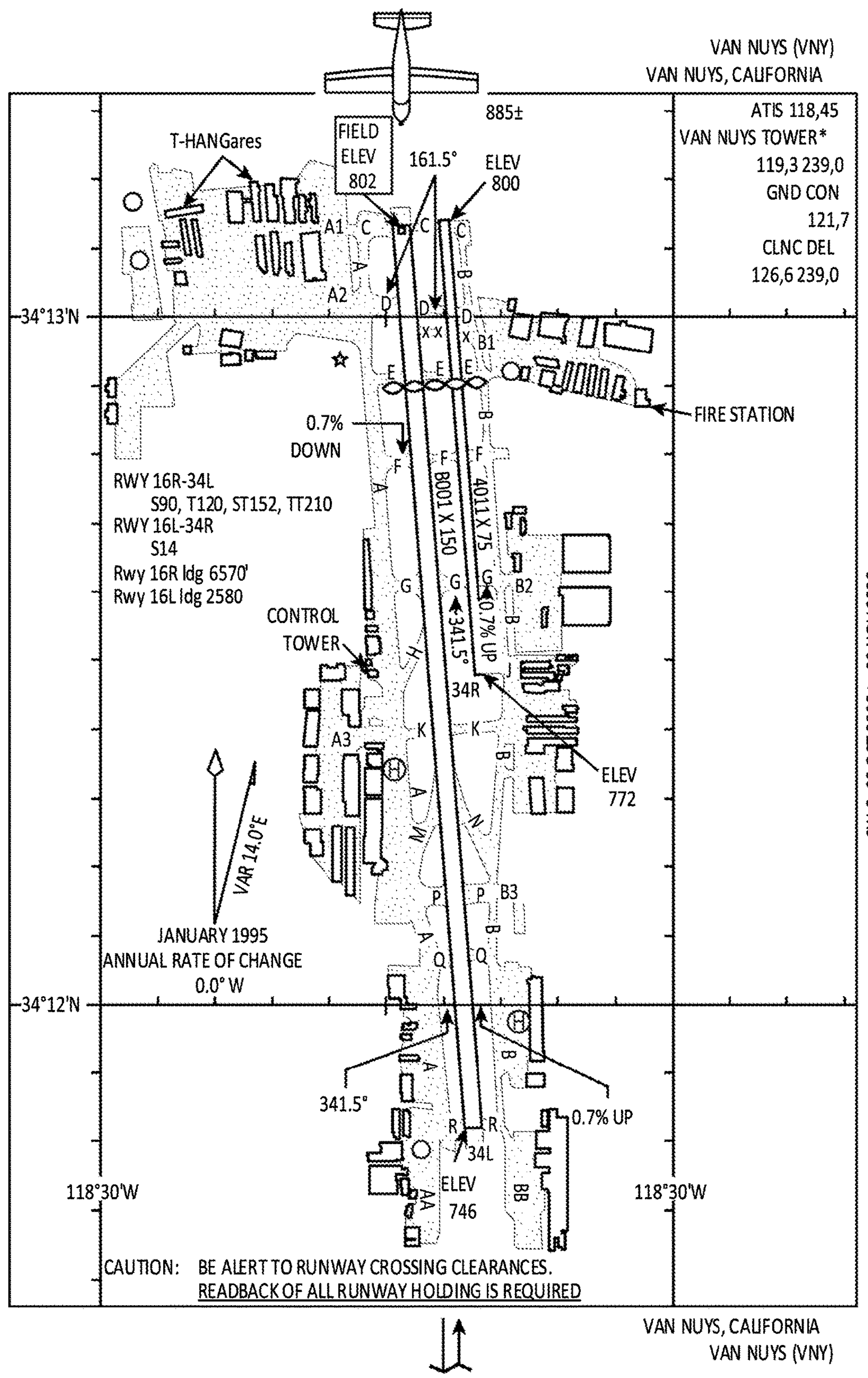

The method can optionally include functionality for using an image-estimated pose, pose trajectory, or other method output to perform a system check. FIG. 5 depicts a method for performing a system check, in accordance with one or more embodiments. As such, the computing system (e.g., portion at a remote station, portion onboard the aircraft) can generate 580 a system check output from a comparison between one or more of the image-estimated pose and the pose trajectory, and an output of another navigation system of the aircraft (e.g., a GPS), to evaluate performance of the other navigation system. For instance, the computing system can compare a position component of a pose of the aircraft associated with a given time stamp to a position of the aircraft determined from a GPS output at the given time stamp. The comparison can be used to determine if the image-derived position is significantly different from the GPS-derived position.

Then, based on the comparison, the computing system can generate 581 instructions for control of the flight management system and/or flight computer of the aircraft, in relation to reliance upon the GPS or other navigation, in relation to aircraft control, and/or for any other suitable purpose. Aircraft control instructions can include various instructions described in Section 2.5 above, or any other suitable instructions. Navigation system control instructions can include instructions for rebooting a navigation system, transitioning a navigation system to a deactivated or idle state, preventing a navigation system from controlling other aircraft subsystems (e.g., an autopilot system), and/or any other suitable navigation system control instructions.

Additionally or alternatively, the method and associated system components can include functionality for supporting a pilot operating the aircraft. For instance, the method and/or system can operate in a co-pilot operation mode where any generated analyses of pose, analyses of pose trajectory, and/or instructions are transformed into notifications to the pilot (e.g., at a display, through an audio output device, etc.) in relation to suggestions for control of the aircraft. Notifications can include a notification to abort landing (if landing is deemed to be unsafe), a notification that indicates that the approach to the landing site is appropriate, a notification related to changes to course of the aircraft (e.g., relative to the landing site), a notification related to configuration of the aircraft in relation to approach to the landing site, and/or any other suitable notification. The method(s) described can, however, include any other suitable steps or functionality for determining aircraft poses while the aircraft is in flight, controlling flight operation of the aircraft (e.g., toward a landing site), and/or evaluating performance of subsystems of the aircraft based on computed pose information.

3. Conclusion

The system and methods described can confer benefits and/or technological improvements, several of which are described herein. For example, the system and method employ non-traditional use of sensors (e.g., image sensors, IMUs, etc.) to determine poses of an aircraft while the aircraft is in flight toward a landing site. Landing an aircraft, in particular, requires dynamic monitoring and control of aircraft operational states, and the method and system employ sensors in a novel manner for control of flight of aircraft (e.g., fixed wing aircraft, other aircraft) in relation to landing.

The system and method also reduces computing requirements and costs associated with standard systems for guided landing. For instance, by using images taken at a set of time points and IMU data, the system achieves determination of aircraft pose and control of aircraft flight operation with less data and computing power than other systems for automated landing.

The system and method also include functionality for evaluating performance of other subsystems of the aircraft (e.g., image capture subsystems, navigation systems, etc.) to improve their performance or otherwise improve safety of a flight operation.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, one implementation of which is set forth in the following claims.

What is claimed is:

1. A method for landing site localization, the method comprising:

in response to detecting an aircraft within a proximity threshold to a landing site, receiving an image taken from a camera subsystem coupled to the aircraft, the image capturing the landing site within a field of view;

transmitting the image to an entity remote from the aircraft;

from the entity, receiving a packet characterizing a reference position of a reference object associated with the landing site, wherein the packet comprises a set of coordinate elements upon the image selected by an input device associated with the entity, and the set of coordinate elements correspond to a boundary of the reference object;

from the reference position, generating an image-estimated pose of the aircraft;

matching the image-estimated pose to one inertial measurement unit (IMU) output of a plurality of IMU outputs from an IMU coupled to the aircraft, wherein the matched IMU output has a time stamp corresponding to the time stamp of the image;

updating a pose trajectory of the aircraft by forward propagating components of the image-estimated pose to a set of IMU outputs generated subsequent to the time stamp; and based upon the updated pose trajectory, generating an updated set of instructions for a flight computer of the aircraft, the set of instructions for flight control of the aircraft toward a flight path to the landing site.

2. The method of claim 1, wherein generating the image-estimated pose comprises:

generating a color-filtered image upon processing the image with a color filter corresponding to a color feature of the reference object;

generating a transformed image upon transforming the color-filtered image from a first dimensional space to a second dimensional space;

extracting the reference position from the transformed image; and generating the image-estimated pose upon processing the reference position, the transformed image, and a set of images of candidate reference objects with a matching operation.

3. The method of claim 2, wherein the reference object comprises at least one of a set of landing site lights and a pattern of landing site markers.

4. The method of claim 1, wherein the reference object comprises a landing site boundary.

5. The method of claim 1, wherein matching the pose trajectory comprises replacing components of the IMU output with components of the image-estimated pose.

6. The method of claim 1, wherein receiving the image comprises receiving a longwave infrared (LWIR) image.

7. The method of claim 1, wherein the camera subsystem comprises:

a first camera mounted to a port side of the aircraft and a second camera mounted to a starboard side of the aircraft, wherein the image comprises a pair of stereoscopic images, and wherein receiving the packet characterizing the reference position comprises transmitting the pair of stereoscopic images to the entity through a user interface device comprising a display, and receiving a selection of a bounding feature corresponding to the reference position through the user interface device.

8. The method of claim 1, wherein in response to detecting an aircraft within a proximity threshold to a landing site, receiving an image taken from a camera subsystem coupled to the aircraft, the image capturing the landing site within a field of view comprises:

receiving a position output from a global positioning system (GPS) of the aircraft;

comparing the position output to a proximity condition characterizing proximity of the aircraft to the landing site;

upon satisfaction of the proximity condition, transitioning a camera subsystem of the aircraft to an image capture mode; and receiving the image from the camera subsystem in the image capture mode.

9. A system for landing site localization, the system comprising:

a camera subsystem mounted to an aircraft with a field of view of a flight path of the aircraft;

an inertial measurement unit (IMU) mounted to the aircraft;

a data transmission subsystem in communication with the camera subsystem and the IMU; and a computing system comprising machine-readable instructions in non-transitory media for:

in response to detecting the aircraft within a proximity threshold to a landing site, receiving an image taken from the camera subsystem coupled to the aircraft, the image capturing the landing site within the field of view;

transmitting the image to an entity remote from the aircraft;

from the entity, receiving a packet characterizing a reference position of a reference object associated with the landing site, wherein the packet comprises a set of coordinate elements upon the image selected by an input device associated with the entity, and the set of coordinate elements correspond to a boundary of the reference object;

from the reference position, generating an image-estimated pose of the aircraft;

matching the image-estimated pose to one inertial measurement unit (IMU) output of a plurality of IMU outputs from an IMU coupled to the aircraft, wherein the matched IMU output has a time stamp corresponding to the time stamp of the image;

updating a pose trajectory of the aircraft by forward propagating components of the image-estimated pose to a set of IMU outputs generated subsequent to the time stamp; and based upon the updated pose trajectory, generating an updated set of instructions for a flight computer of the aircraft, the set of instructions for flight control of the aircraft toward a flight path to the landing site.

10. The system of claim 9, wherein the camera subsystem comprises a longwave infrared (LWIR) sensor.

11. The system of claim 9, wherein the camera subsystem comprises a first camera mounted to a port side of the aircraft and a second camera mounted to a starboard side of the aircraft, wherein the image comprises a stereoscopic image, and wherein the computing system comprises instructions for generating the image-estimated pose of the aircraft from the stereoscopic image.

12. The system of claim 9, further comprising an electronic interface between the computing system and a flight computer of the aircraft, the flight computer coupled to and controlling operational configurations of control surfaces of the aircraft, and the electronic interface operable in a mode that transmits the set of instructions to the flight computer and controls flight of the aircraft toward the flight path.

13. The system of claim 9, wherein generating the image-estimated pose comprises:

generating a color-filtered image upon processing the image with a color filter corresponding to a color feature of the reference object;

generating a transformed image upon transforming the color-filtered image from a first dimensional space to a second dimensional space;

extracting the reference position from the transformed image; and generating the image-estimated pose upon processing the reference position, the transformed image, and a set of images of candidate reference objects with a matching operation.

14. The system of claim 13, wherein the reference object comprises at least one of a set of landing site lights and a pattern of landing site markers.

15. The system of claim 9, wherein the reference object comprises a landing site boundary.

16. The system of claim 9, wherein matching the pose trajectory comprises replacing components of the IMU output with components of the image-estimated pose.

17. The system of claim 13, wherein in response to detecting an aircraft within a proximity threshold to a landing site, receiving an image taken from a camera subsystem coupled to the aircraft, the image capturing the landing site within a field of view comprises:

receiving a position output from a global positioning system (GPS) of the aircraft;

comparing the position output to a proximity condition characterizing proximity of the aircraft to the landing site;

upon satisfaction of the proximity condition, transitioning a camera subsystem of the aircraft to an image capture mode; and receiving the image from the camera subsystem in the image capture mode.

18. A non-transitory computer-readable storage medium storing computer readable instructions executable by a processor to perform operations for landing site localization, the operations comprising:

in response to detecting an aircraft within a proximity threshold to a landing site, receiving an image taken from a camera subsystem coupled to the aircraft, the image capturing the landing site within a field of view;

transmitting the image to an entity remote from the aircraft;

from the entity, receiving a packet characterizing a reference position of a reference object associated with the landing site, wherein the packet comprises a set of coordinate elements upon the image selected by an input device associated with the entity, and the set of coordinate elements correspond to a boundary of the reference object;

from the reference position, generating an image-estimated pose of the aircraft;

matching the image-estimated pose to one inertial measurement unit (IMU) output of a plurality of IMU outputs from an IMU coupled to the aircraft, wherein the matched IMU output has a time stamp corresponding to the time stamp of the image;

updating a pose trajectory of the aircraft by forward propagating components of the image-estimated pose to a set of IMU outputs generated subsequent to the time stamp; and based upon the updated pose trajectory, generating an updated set of instructions for a flight computer of the aircraft, the set of instructions for flight control of the aircraft toward a flight path to the landing site.

* * * * *